US011914393B2

(12) United States Patent
Weyant et al.

(10) Patent No.: US 11,914,393 B2
(45) Date of Patent: Feb. 27, 2024

(54) SEASONAL RECOMMENDATIONS FOR AN AUTONOMOUS MOBILE ROBOT

(71) Applicant: iRobot Corporation, Bedford, MA (US)

(72) Inventors: Matthew Weyant, Medford, MA (US); Teresa Borcuch, Acton, MA (US); Jacki Holcomb, Sudbury, MA (US); Andrew Scott Reichel, Medford, MA (US); Erik Moore, Bedford, MA (US)

(73) Assignee: iRobot Corporation, Bedford, MA (US)

(*) Notice: Subject to any disclaimer, the term of this patent is extended or adjusted under 35 U.S.C. 154(b) by 193 days.

(21) Appl. No.: 17/410,775

(22) Filed: Aug. 24, 2021

(65) Prior Publication Data
US 2022/0061621 A1    Mar. 3, 2022

Related U.S. Application Data

(60) Provisional application No. 63/069,921, filed on Aug. 25, 2020.

(51) Int. Cl.
*G05D 1/02* (2020.01)
*G05D 1/00* (2006.01)

(52) U.S. Cl.
CPC ......... *G05D 1/0274* (2013.01); *G05D 1/0044* (2013.01); *G05D 1/0219* (2013.01); *G05D 1/0221* (2013.01); *A47L 2201/04* (2013.01)

(58) Field of Classification Search
CPC .. G05D 1/0274; G05D 1/0044; G05D 1/0219; G05D 1/0221; G05D 2201/0215; G05D 1/0011; G05D 2201/0203; G05D 1/0016; G05D 1/0212; A47L 2201/04; A47L 2201/06
See application file for complete search history.

(56) References Cited

U.S. PATENT DOCUMENTS

| | | | |
|---|---|---|---|
| 7,011,046 B1 * | 3/2006 | Kidwell | A01K 1/033 119/657 |
| 7,196,487 B2 | 3/2007 | Jones et al. | |
| 7,404,000 B2 | 7/2008 | Lolayekar et al. | |
| 2005/0156562 A1 | 7/2005 | Cohen et al. | |
| 2014/0100693 A1 | 4/2014 | Fong et al. | |

(Continued)

OTHER PUBLICATIONS

"International Application Serial No. PCT US2021 047362, International Search Report dated Nov. 12, 2021", 4 pgs.

(Continued)

*Primary Examiner* — Bao Long T Nguyen
(74) *Attorney, Agent, or Firm* — Schwegman Lundberg & Woessner, P.A.

(57) ABSTRACT

Systems, devices, and methods for scheduling and controlling a mobile cleaning robot based on a seasonal or environmental debris accumulation event are discussed. A mobile cleaning robot receives a seasonal cleaning schedule corresponding to a seasonal or environmental debris accumulation event. The seasonal cleaning schedule includes instructions to clean a portion of the mobile robot's environment having a debris state varied seasonally. The mobile cleaning robot executes a cleaning mission in the environment in accordance with the seasonal cleaning schedule.

20 Claims, 12 Drawing Sheets

(56) References Cited

U.S. PATENT DOCUMENTS

| | | | |
|---|---|---|---|
| 2014/0201182 A1* | 7/2014 | Amin | G01N 33/0031 |
| | | | 707/706 |
| 2014/0207282 A1 | 7/2014 | Angle et al. | |
| 2016/0135655 A1* | 5/2016 | Ahn | G05D 1/0044 |
| | | | 15/319 |
| 2018/0070787 A1* | 3/2018 | Gordon | A47L 9/2852 |
| 2018/0353044 A1* | 12/2018 | Erkek | G05D 1/0274 |
| 2019/0082918 A1 | 3/2019 | Koetz | |
| 2019/0380547 A1* | 12/2019 | Turpin | A47L 11/4027 |

OTHER PUBLICATIONS

"International Application Serial No. PCT US2021 047362, Written Opinion dated Nov. 12, 2021", 7 pgs.

"International Application Serial No. PCT US2021 047362, International Preliminary Report on Patentability dated Mar. 9, 2023", 8 pgs.

"European Application Serial No. 21778269.7, Response filed Oct. 13, 2023 to Communication pursuant to Rules 161(1) and 162 EP", 15 pgs.

"European Application Serial No. 21778269.7, Communication Pursuant to Article 94(3) EPC dated Dec. 14, 2023", 6 pgs.

\* cited by examiner

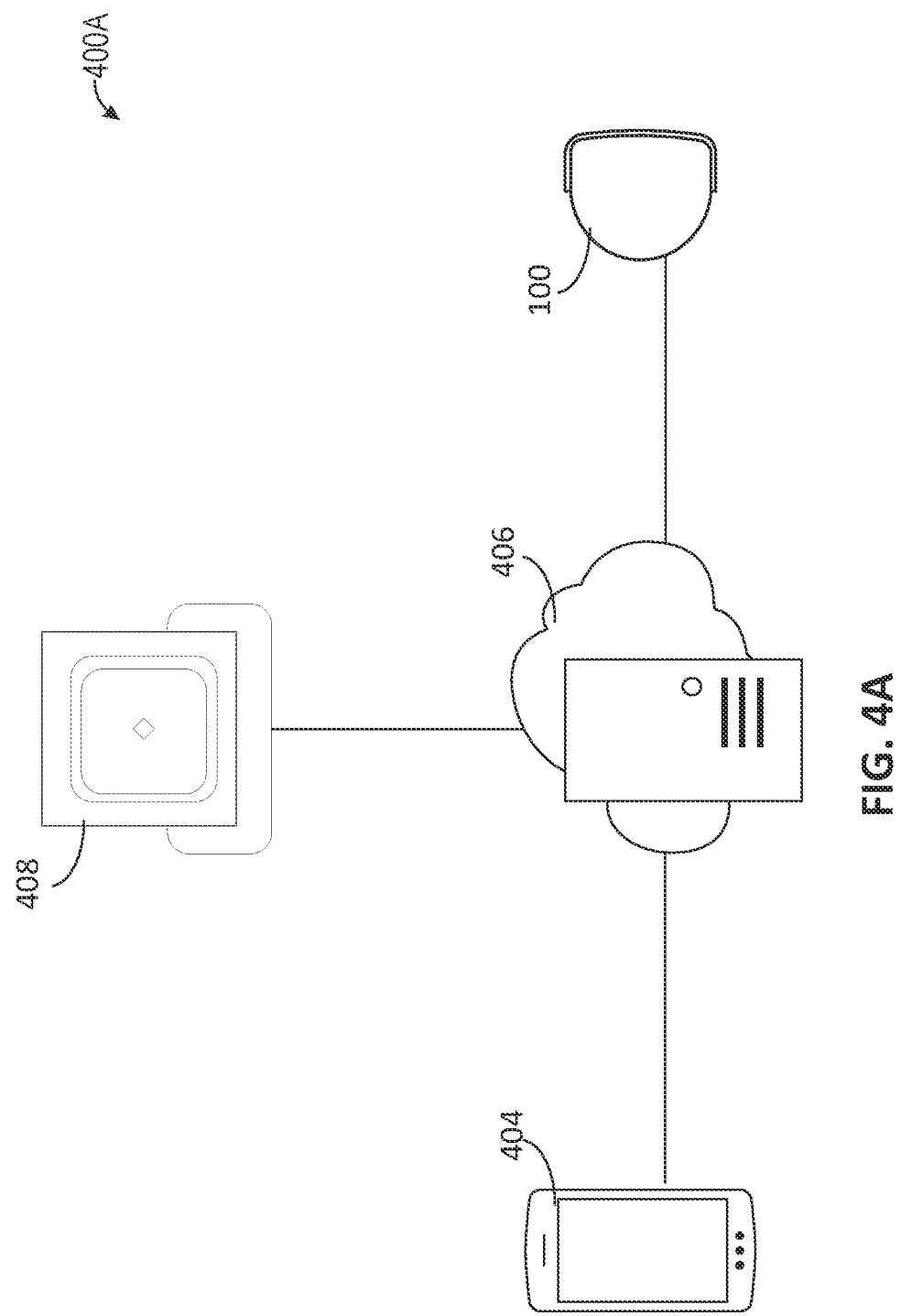

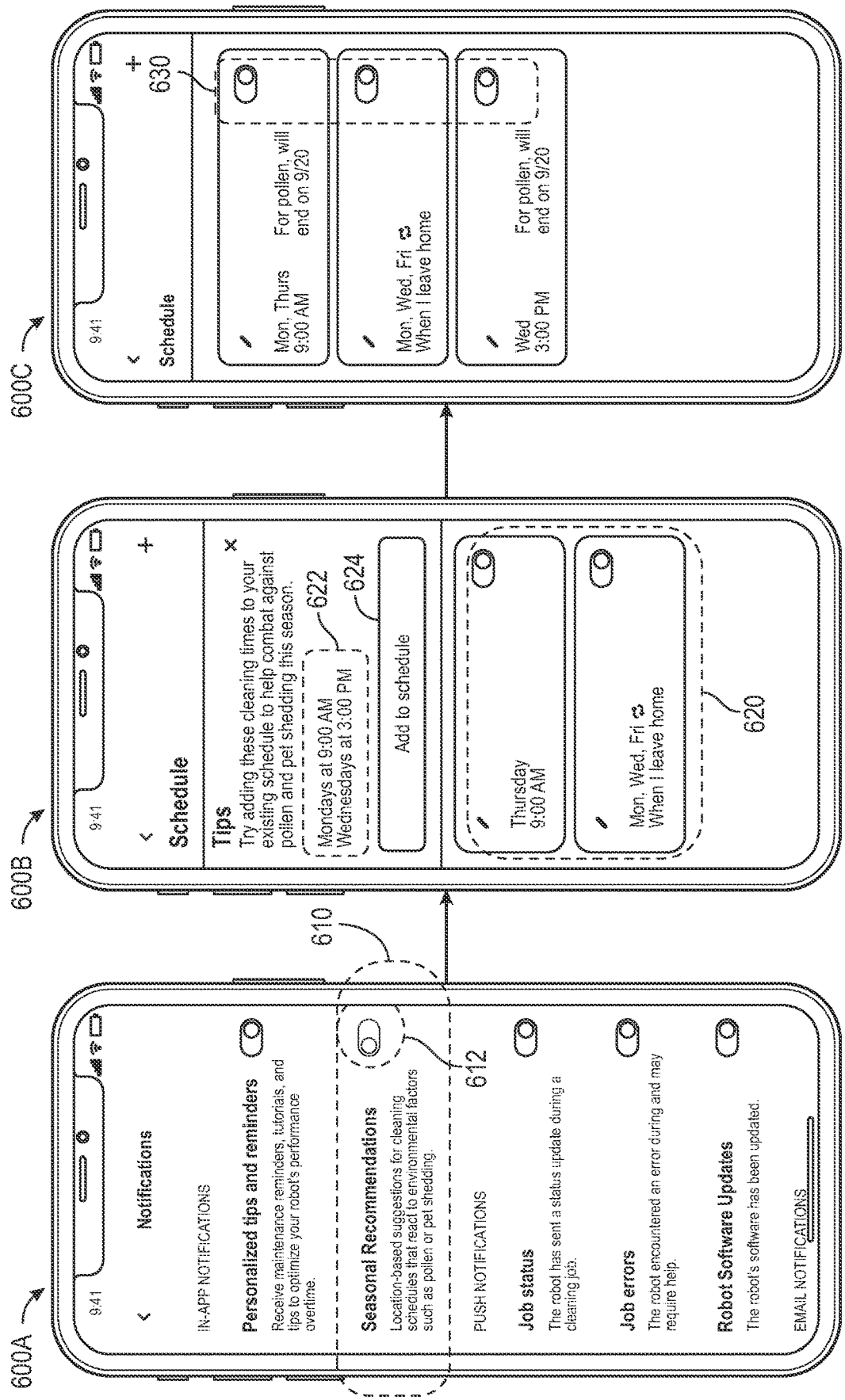

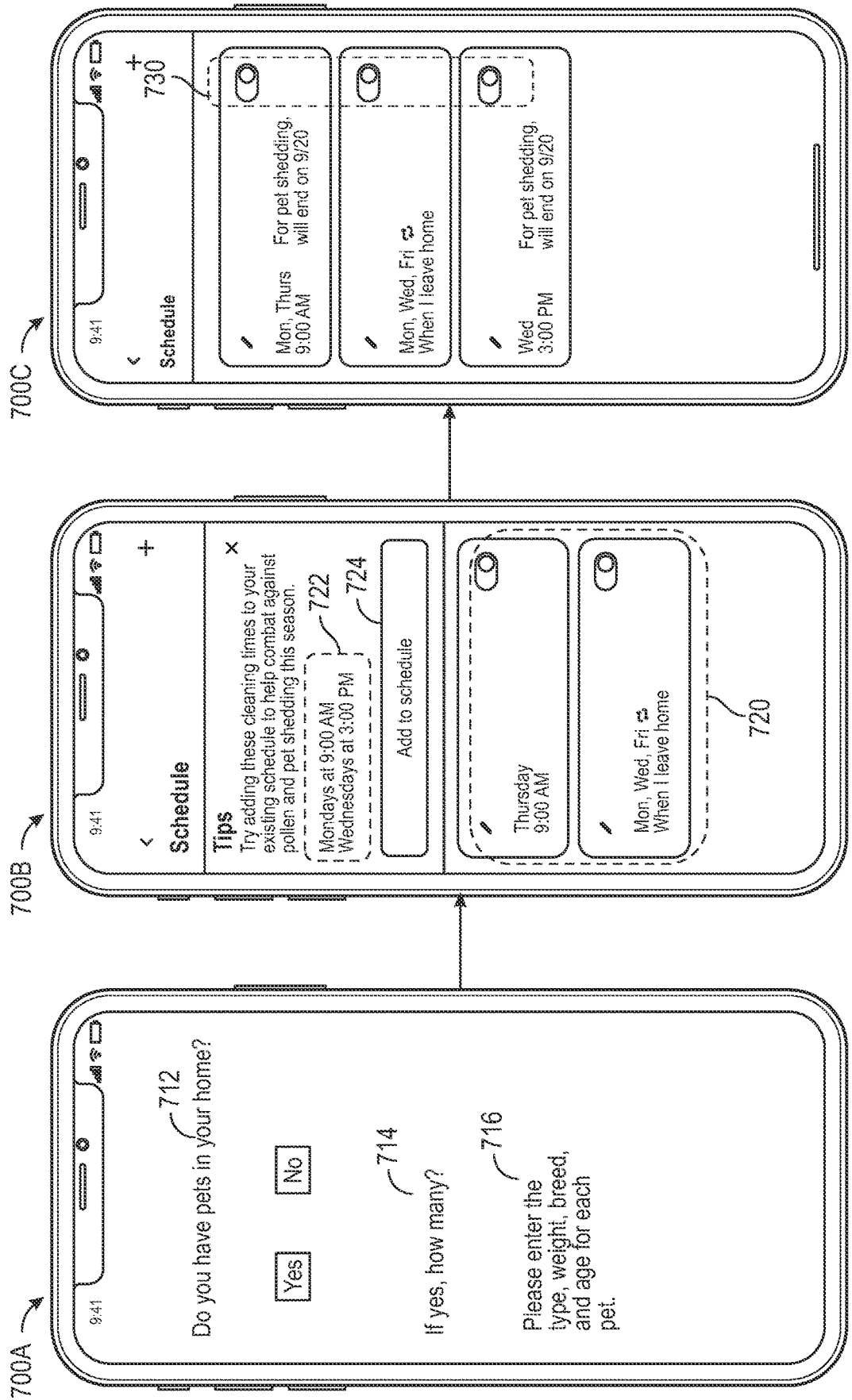

SEASONAL RECOMMENDATIONS FOR AN AUTONOMOUS MOBILE ROBOT

PRIORITY APPLICATIONS

This application claims the benefit of priority to U.S. Provisional Application Ser. No. 63/069,921, filed Aug. 25, 2020, the content of which is hereby incorporated by reference in its entirety.

TECHNICAL FIELD

This document relates generally to mobile robots and, more particularly, to systems and methods for scheduling cleaning based on seasonal or environmental events.

BACKGROUND

Autonomous mobile robots can move about an environment, and perform several functions and operations in a variety of categories, including but not limited to security operations, infrastructure or maintenance operations, navigation or mapping operations, inventory management operations, and robot/human interaction operations. Some mobile robots, known as mobile cleaning robots, can autonomously perform cleaning tasks within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

Some autonomous mobile robots can be controlled by a user via a mobile device. The user may use the mobile device to create a cleaning schedule for an autonomous mobile robot. The cleaning schedule can define cleaning times or certain conditions under which the autonomous mobile cleaning robot is set to perform cleaning. The autonomous mobile cleaning robot can execute a cleaning mission in accordance with the cleaning schedule in the user's home.

SUMMARY

This document describes systems, devices, and methods for scheduling and controlling a mobile cleaning robot based on a seasonal or environmental debris accumulation event, such as a pollen production, pet shedding, or a seasonal weather event. Such seasonal or environmental events may change the rate of debris accumulation in the mobile cleaning robot's environment over time. Cleaning schedules created for certain times free of seasonal debris accumulation events may not provide adequate cleaning in other times during the peak of a debris accumulation season. Adjusting cleaning schedules based on seasonal or environmental debris accumulation events, as described in this document, can improve cleaning efficiency and efficacy, and enhance a user's experience with personalized cleaning.

In accordance with various examples, a mobile cleaning robot can receive a seasonal cleaning schedule corresponding to a seasonal or environmental debris accumulation event. The seasonal cleaning schedule can be generated using a mobile device communicatively coupled to the mobile cleaning robot using information about the seasonal debris accumulation event, such as predicted timing or a timespan of the event. The seasonal cleaning schedule includes instructions to clean a portion of the environment having a debris state varied seasonally. The mobile cleaning robot can execute a cleaning mission in the environment in accordance with the seasonal cleaning schedule.

Example 1 is a mobile cleaning robot that comprises a drive system, a cleaning system, and a controller. The drive system can be configured to move the mobile cleaning robot about an environment. The controller can be configured to receive a seasonal cleaning schedule corresponding to a seasonal debris accumulation event, the seasonal cleaning schedule including instructions to clean a portion of the environment based on a debris state varied seasonally, and generate a control signal to the drive system and the cleaning system to execute a cleaning mission in the environment in accordance with the seasonal cleaning schedule.

In Example 2, the subject matter of Example 1 optionally includes the controller that can be configured to receive information about a timespan for the seasonal debris accumulation event based on a geographical location of the environment, and wherein the seasonal cleaning schedule is based on the timespan of the seasonal debris accumulation event.

In Example 3, the subject matter of Example 2 optionally includes the controller that can be configured to receive the information about a timespan of the seasonal debris accumulation event from an internet-connected device, or from a user input to a mobile device, communicatively coupled to the mobile cleaning robot.

In Example 4, the subject matter of any one or more of Examples 1-3 optionally includes the seasonal cleaning schedule that can include cleaning the portion of the environment having a first debris state at a first cleaning time, and cleaning the portion of the environment having a second debris state at a second cleaning time, the first debris state having a higher expected debris accumulation in the environment than the second debris state.

In Example 5, the subject matter of Example 4 optionally includes the seasonal cleaning schedule that can include a first cleaning mode for cleaning the portion of the environment having the first debris state, and a second cleaning mode, different from the first cleaning mode, for cleaning the portion of the environment having the second debris state.

In Example 6, the subject matter of any one or more of Examples 1-5 optionally includes the seasonal debris accumulation event that can include seasonal pollen production during a pollen season, and the seasonal cleaning schedule is based on the pollen season.

In Example 7, the subject matter of Example 6 optionally includes the controller that can be configured to receive information about the pollen season based on a geographical location of the environment.

In Example 8, the subject matter of any one or more of Examples 6-7 optionally includes the seasonal cleaning schedule that can include a seasonal cleaning mode for cleaning a pollen area in the environment.

In Example 9, the subject matter of Example 8 optionally includes the controller that can be coupled to a sensor of the mobile cleaning robot to detect and localize the pollen area in the environment.

In Example 10, the subject matter of Example 9 optionally includes the controller that can be configured to detect and localize the pollen area including an area in proximity to an opening of the environment.

In Example 11, the subject matter of any one or more of Examples 9-10 optionally includes the controller that can be configured to receive information about an environmental or weather condition, and to adjust the pollen area based on the environmental or weather condition.

In Example 12, the subject matter of any one or more of Examples 1-11 optionally includes the seasonal debris accumulation event that can include seasonal pet shedding during a pet-shedding season, and the seasonal cleaning schedule is based on the pet-shedding season.

In Example 13, the subject matter of Example 12 optionally includes the controller that can be configured to receive information about the pet-shedding season based on a geographical location of the environment, or based on pet information including presence, age, breed, or weight of a pet in the environment.

In Example 14, the subject matter of any one or more of Examples 12-13 optionally includes the seasonal cleaning schedule that can include a seasonal cleaning mode for cleaning a pet shedding area in the environment.

In Example 15, the subject matter of Example 14 optionally includes the controller that can be coupled to a sensor of the mobile cleaning robot to detect a pet in the environment, and to determine the pet shedding area based on the detected pet.

In Example 16, the subject matter of any one or more of Examples 14-15 optionally includes the controller that can be coupled to a sensor of the mobile cleaning robot to detect a pet utility in the environment, and to determine the pet shedding area based on the detected pet utility.

In Example 17, the subject matter of any one or more of Examples 1-16 optionally includes the controller that can be configured to generate a map of the environment and a graphical representation of the debris state on the map.

In Example 18, the subject matter of Example 17 optionally includes the graphical representation of the debris state that can include a graphical representation of a spatial density of seasonal debris in the environment.

Example 19 is a mobile robot system, comprising: a mobile cleaning robot comprising: a drive system configured to move the mobile cleaning robot about an environment; a cleaning system; and a controller; and a mobile device operably in communication with the mobile cleaning robot and configured to receive information about a seasonal debris accumulation event, and to generate a seasonal cleaning schedule corresponding to the seasonal debris accumulation event, the seasonal cleaning schedule including instructions to clean a portion of the environment based on a debris state varied seasonally, wherein the controller of the mobile cleaning robot is configured to receive the seasonal cleaning schedule from the mobile device, and to generate a control signal to the mobile cleaning robot to execute a cleaning mission in the environment in accordance with the seasonal cleaning schedule.

In Example 20, the subject matter of Example 19 optionally includes the seasonal debris accumulation event that can include seasonal pollen production during a pollen season, and the mobile device that can be configured to: receive information about a geographical location of the environment; determine the pollen season based on the geographical location of the environment; and determine the seasonal cleaning schedule based on the pollen season.

In Example 21, the subject matter of Example 20 optionally includes the controller that can be coupled to a sensor of the mobile cleaning robot to detect and localize a pollen area in the environment; and the seasonal cleaning schedule includes a cleaning mode for cleaning the pollen area.

In Example 22, the subject matter of Example 21 optionally includes the controller that can be configured to detect and localize the pollen area including an area in proximity to an opening of the environment.

In Example 23, the subject matter of any one or more of Examples 21-22 optionally includes the controller that can be configured to receive information about an environmental or weather condition, and to adjust the pollen area based on the environmental or weather condition.

In Example 24, the subject matter of any one or more of Examples 19-23 optionally includes the seasonal debris accumulation event that can include seasonal pet shedding during a pet-shedding, season, and wherein the mobile device is configured to: receive information about a geographical location of the environment, or pet information including age, breed, or weight; determine the pet-shedding season based on the geographical location of the environment or the pet information; and determine the seasonal cleaning schedule based on the pet-shedding; season.

In Example 25, the subject matter of Example 24 optionally includes the controller that can be coupled to a sensor of the mobile cleaning robot to detect and localize a pet shedding area in the environment; and the seasonal cleaning schedule that can include a cleaning mode for cleaning the pet shedding area.

In Example 26, the subject matter of Example 25 optionally includes the controller that can be coupled to the sensor of the mobile cleaning robot to detect a pet in the environment, and to determine the pet shedding area based on the detected pet.

In Example 27, the subject matter of any one or more of Examples 25-26 optionally includes the controller that can be coupled to the sensor of the mobile cleaning robot to detect a pet utility in the environment, and to determine the pet shedding area based on the detected pet utility.

In Example 28, the subject matter of any one or more of Examples 19-27 optionally includes the controller that can be configured to generate a map of the environment, including a graphical representation of the debris state, for displaying on a user interface of the mobile device.

In Example 29, the subject matter of Example 28 optionally includes the graphical representation of the debris state that can include a graphical representation of a spatial density of seasonal debris in the environment.

In Example 30, the subject matter of any one or more of Examples 19-29 optionally includes the mobile device that can be configured to receive user input for generating the seasonal cleaning schedule or a modification of an existing cleaning schedule.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 4A is a diagram illustrating an example of a communication network in which a mobile cleaning robot operates and data transmission in the network.

FIGS. 6A-6C are wireframes of a user interface on a mobile device illustrating generation of seasonal schedules for cleaning pollen during a pollen season.

FIGS. 7A-7C are wireframes of a user interface on a mobile device illustrating generation of a seasonal schedule for cleaning pet hair during a pet-shedding season.

DETAILED DESCRIPTION

Figure 1:
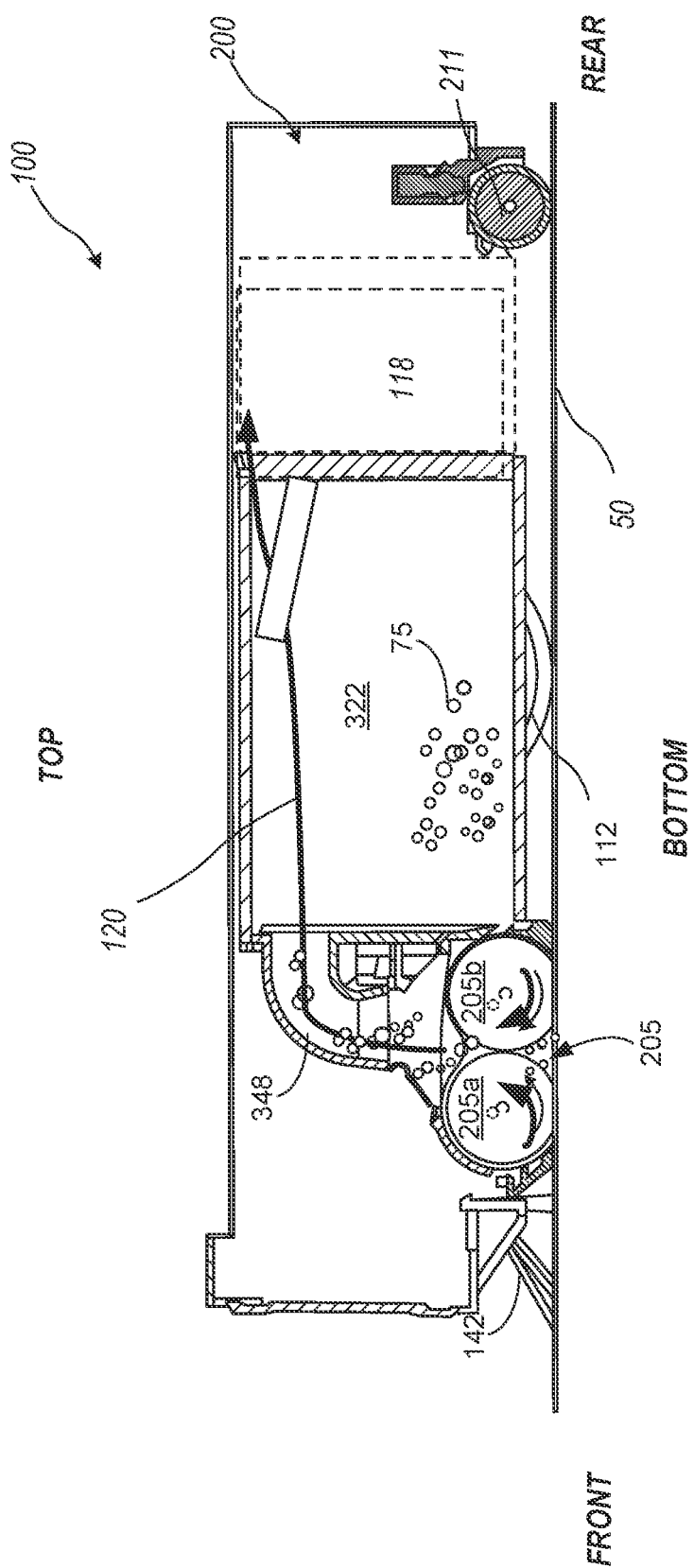
FIGS. 1, 2A, and 2B are side cross-sectional, bottom, and top perspective views of a mobile robot.

An autonomous mobile robot may be controlled locally or remotely to execute a mission, such as a cleaning mission involving rooms or floor surface areas to be cleaned by a mobile cleaning robot, and a schedule for cleaning such areas. A user can interact with the autonomous mobile cleaning robot via a user interface on a mobile device. The mobile device may display a map of the environment created by the mapping system of autonomous mobile robot. The user may use the mobile device to create a cleaning schedule. The autonomous mobile cleaning robot can execute the cleaning mission to clean designated areas at certain times, or when certain events occur. For example, the user can provide a schedule where the robot is instructed to clean an area of the home in certain days of a weeks at respective times. Alternatively, the user can provide a schedule where the robot is instructed to clean an area of the home when the user leaves for work. The areas may include a number of rooms, hallways, objects, etc.

During certain times of a year, seasonal or environmental events may change the rate of debris accumulation in the mobile robot's environment, such as the user's home. Examples of such events, also referred to as seasonal or environmental debris accumulation events, may include pollen production, pet shedding, and weather events, among others. For example, pollen production can be relatively high in certain time of the year generally known as pollen or allergy season, which may vary geographically due to different temperature, humidity, elevation, precipitation, and distinctive ecosystems with unique allergens presented varieties of trees, weeds, and grasses. Shedding in pets can vary during different times of the year. For example, most dogs shed more frequently during spring and fall months than other times of the years. The longer and thicker hair grown in the winter is shed in the spring and replaced by a lighter one for summer. The summer coat is then shed again in the fall to be replaced by the heavier and thicker winter one. The exact peak shedding months vary depending on the weather, amount of daylight, breed of dog, nutrition, age, sex, living environment and overall health condition. Seasonal weather events may include, for example, rainy or snowy days in rainy or snowy season when mud is tracked into certain areas of a home at a relatively higher rate. The rainy or snowy seasons may vary geographically.

Seasonal debris accumulation events can reduce the effectiveness of a regular cleaning schedule implemented by a user. For example, a cleaning schedule created for a time free of seasonal debris accumulation events (e.g., winter times in areas where pollen or other allergen levels are low, or summer when dog shedding is minimal) may not provide adequate amount of cleaning during the peak of a debris accumulation season. On the other hand, cleaning schedules specifically created to accommodate excess seasonal debris accumulation (e.g., additional cleanings) may be unnecessary and waste energy when used off the peak season of debris accumulation.

The present inventors have recognized an unmet need for improved, personalized cleaning schedules to counteract increased debris accumulation in the home due to seasonal or environmental debris accumulation events. For example, in the presence of a seasonal or environmental debris accumulation event or in anticipation of such an event, an existing "default" or regular cleaning schedule can be modified to provide, for example, additional amount of cleaning. At the conclusion of such seasonal or environmental debris accumulation events, the cleaning schedule can be modified to, for example, revert back to the default or the regular schedule which has less amount of cleaning. A cleaning schedule based on seasonal or environmental debris accumulation events, as described in various examples in this document, can improve the mobile robot's cleaning efficiency and efficacy, and enhance the user's experience with personalized cleaning.

The mobile robots and scheduling techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that may include one or more processing devices and memory to store executable instructions to implement various operations.

In the following, mobile robot and its working environment are briefly discussed with reference to FIGS. 1-4B Detailed descriptions of systems, devices, mobile applications, and methods for creating cleaning schedules for an autonomous mobile robot based on seasonal or environmental debris accumulation events are discussed with reference to FIGS. 5 to 10.

Example Autonomous Mobile Robots

Figure 2A:
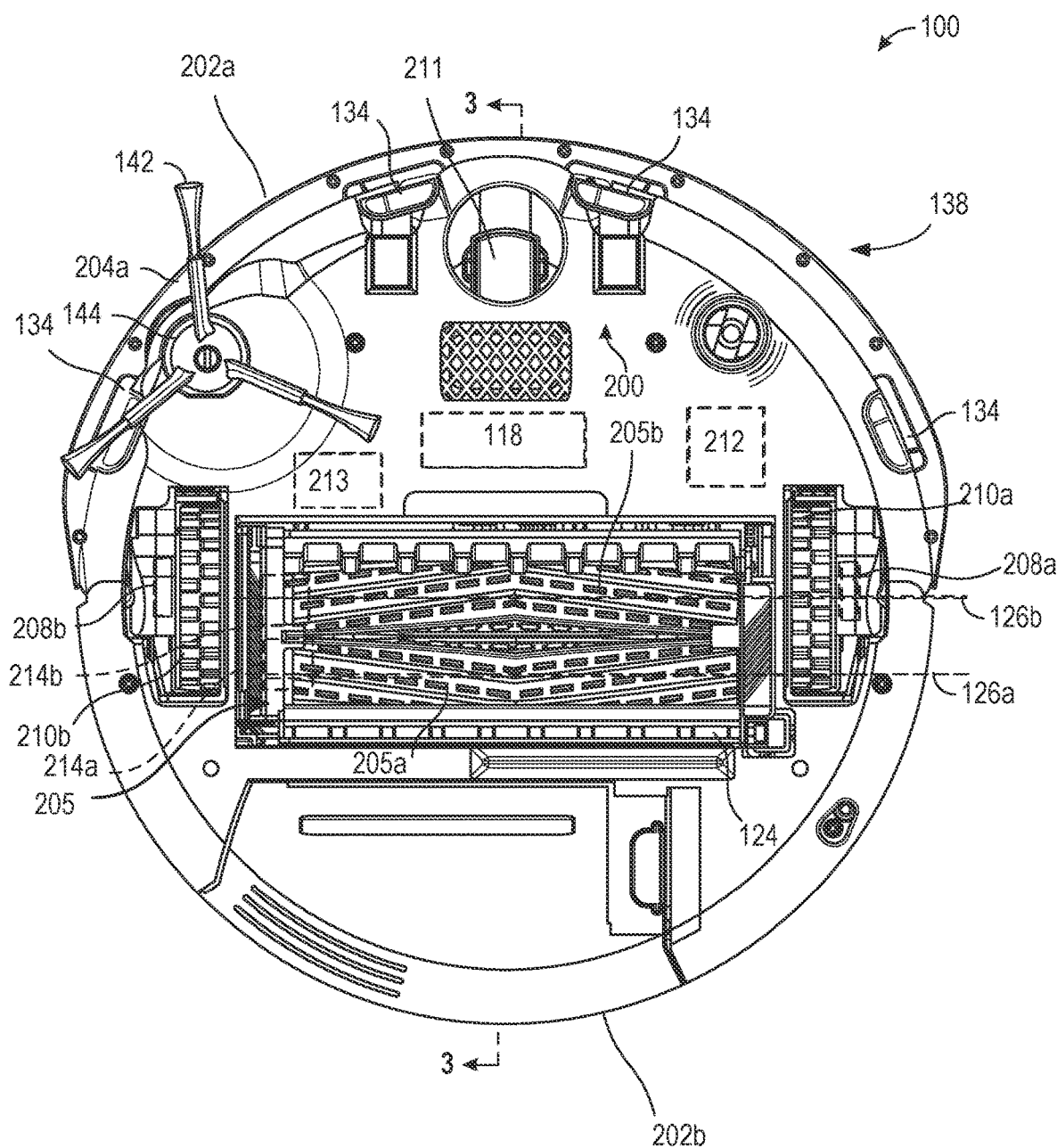
Figure 2B:
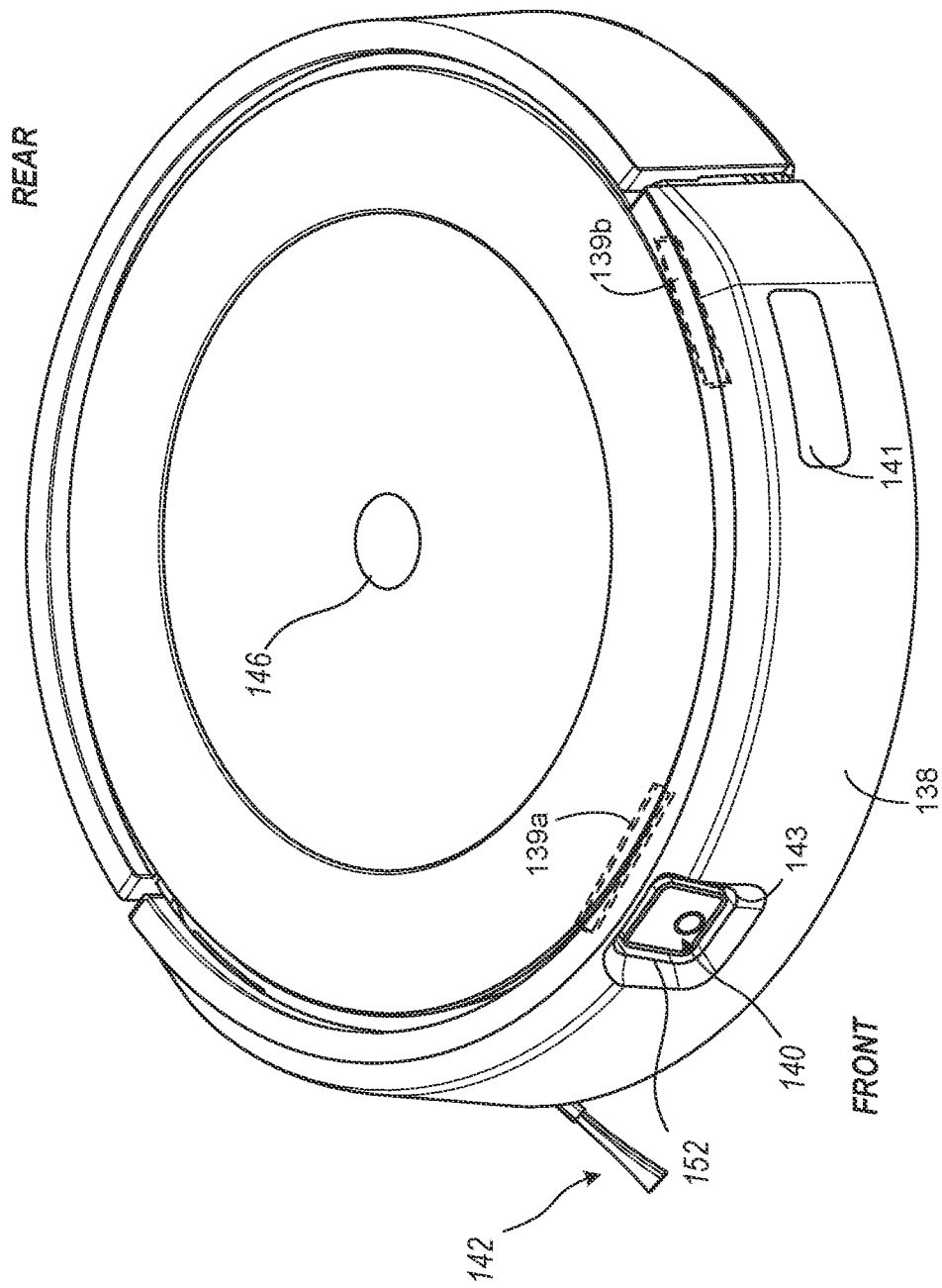
Figure 3:
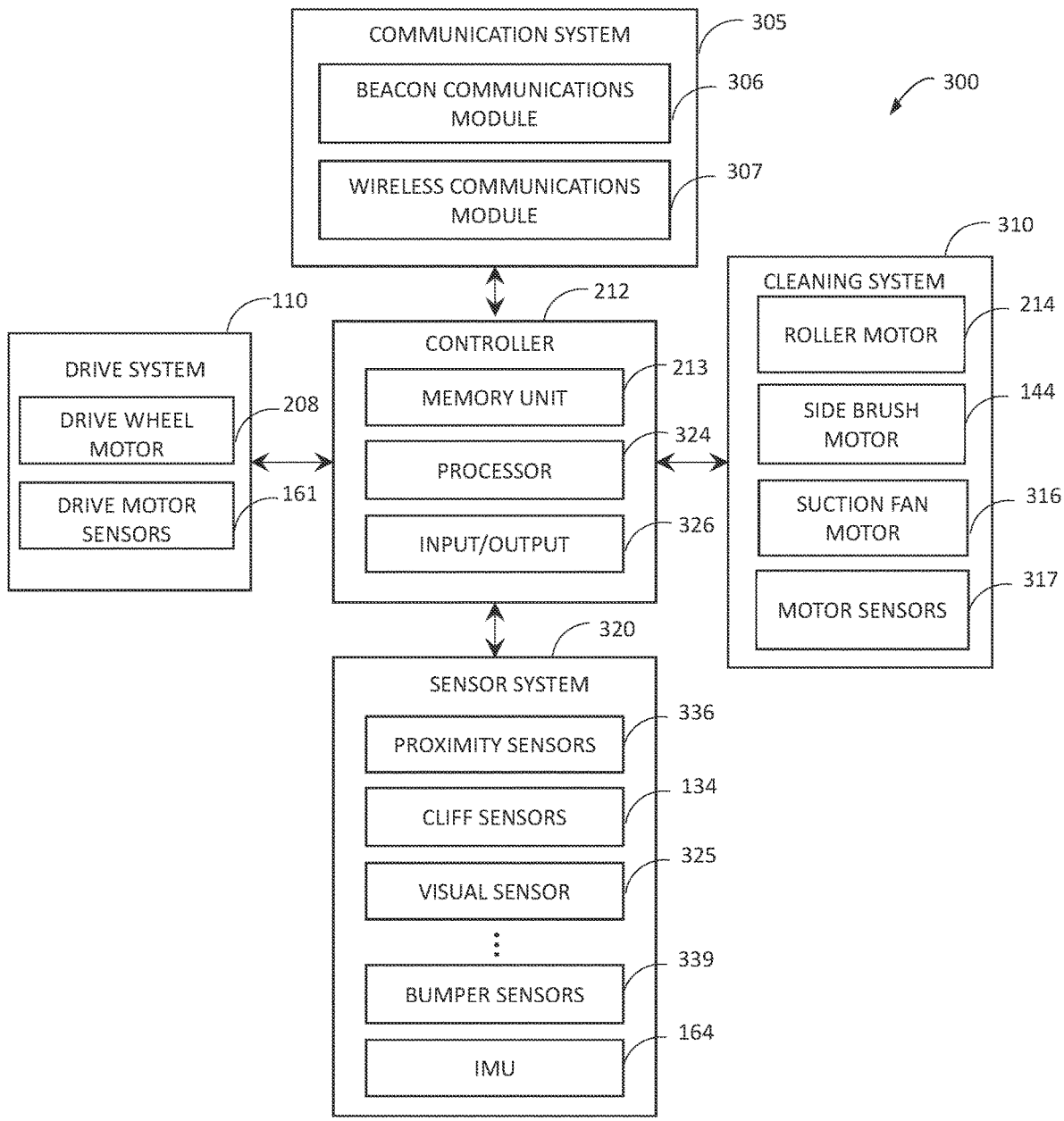
FIG. 3 is a diagram illustrating an example of a control architecture for operating a mobile cleaning robot.

FIGS. 1 and 2A-2B depict different views of an example of a mobile cleaning robot 100. FIG. 1 illustrates a cross-section view of the mobile cleaning robot 100. FIG. 2A illustrates a bottom view of the mobile cleaning robot 100. FIG. 2B illustrates a bottom view of the mobile cleaning robot 100. The cross-section view in FIG. 1 is obtained through the across indicators 3-3 of FIG. 2A of the mobile cleaning robot 100. FIG. 1 also shows orientation indicators Bottom, Top, Front, and Rear. FIGS. 2A-3 are discussed together below.

The cleaning robot 100 can be an autonomous cleaning robot that autonomously traverses the floor surface 50 while ingesting the debris 75 from different parts of the floor surface 50. As depicted in FIGS. 2A and 1, the robot 100 includes a body 200 movable across the floor surface 50. The body 200 may include multiple connected structures to which movable components of the cleaning robot 100 are mounted. The connected structures may include, for example, an outer housing to cover internal components of the cleaning robot 100, a chassis to which drive wheels 210a and 210b and the cleaning rollers 205a and 205b (of a cleaning head 205) are mounted, a bumper 138 mounted to the outer housing, etc.

As shown in FIG. 2A, the body 200 includes a front portion 202a that has a substantially semicircular shape and a rear portion 202b that has a substantially semicircular shape. As shown in FIG. 2A, the robot 100 may include a drive system including actuators 208a and 208b, e.g., motors, operable with drive wheels 210a and 210b. The actuators 208a and 208b can be mounted in the body 200 and can be operably connected to the drive wheels 210a and 210b, which are rotatably mounted to the body 200. The drive wheels 210a and 210b support the body 200 above the floor surface 50. The actuators 208a and 208b, when driven, can rotate the drive wheels 210a and 210b to enable the robot 100 to autonomously move across the floor surface 50.

The controller (or processor) 212 can be located within the housing and can be a programmable controller, such as a single or multi-board computer, a direct digital controller (DDC), a programmable logic controller (PLC), or the like. In other examples the controller 212 can be any computing device, such as a handheld computer, for example, a smart phone, a tablet, a laptop, a desktop computer, or any other computing device including a processor, memory, and communication capabilities. The memory 213 can be one or more types of memory, such as volatile or non-volatile memory, read-only memory (ROM), random-access memory (RAM), magnetic disk storage media, optical storage media, flash-memory devices, and other storage devices and media. The memory 213 can be located within the body 200, connected to the controller 212 and accessible by the controller 212.

The controller 212 can operate the actuators 208a and 208b to autonomously navigate the robot 100 about the floor surface 50 during a cleaning operation. The actuators 208a and 208b are operable to drive the robot 100 in a forward drive direction, in a backwards direction, and to turn the robot 100. The robot 100 may include a caster wheel 211 that supports the body 200 above the floor surface 50. The caster wheel 211 can support the rear portion 202b of the body 200 above the floor surface 50, and the drive wheels 210a and 210b support the front portion 202a of the body 200 above the floor surface 50.

As shown in FIG. 1, a vacuum assembly 118 can be carried within the body 200 of the robot 100, e.g., in the front portion 202a of the body 200. The controller 212 can operate the vacuum assembly 118 to generate an airflow that flows through the air gap near the cleaning rollers 205a and 205b, through the body 200, and out of the body 200. The vacuum assembly 118 may include, for example, an impeller that generates the airflow when rotated. The airflow and the cleaning rollers 205a and 205b, when rotated, cooperate to ingest debris 75 into the robot 100. A cleaning bin 322 mounted in the body 200 contains the debris 75 ingested by the robot 100, and a filter in the body 200 separates the debris 75 from the airflow before the airflow 120 enters the vacuum assembly 118 and is exhausted out of the body 200, in this regard, the debris 75 is captured in both the cleaning bin 322 and the filter before the airflow 120 is exhausted from the body 200.

The cleaning rollers 205a and 205b can operably connected to actuators 214a and 214b, e.g., motors, respectively. The cleaning head 205 and the cleaning rollers 205a and 205b can be positioned forward of the cleaning bin 322. The cleaning rollers 205a and 205b can be mounted to a housing 124 of the cleaning head 205 and mounted, e.g., indirectly or directly, to the body 200 of the robot 100. In particular, the cleaning rollers 205a and 205b are mounted to an underside of the body 200 so that the cleaning rollers 205a and 205b engage debris 75 on the floor surface 50 during the cleaning operation when the underside faces the floor surface 50.

The housing 124 of the cleaning head 205 can be mounted to the body 200 of the robot 100. In this regard, the cleaning rollers 205a and 205b are also mounted to the body 200 of the robot 100, e.g., indirectly mounted to the body 200 through the housing 124. Alternatively, or additionally, the cleaning head 205 is a removable assembly of the robot 100 in which the housing 124 with the cleaning rollers 205a and 205b mounted therein is removably mounted to the body 200 of the robot 100. The housing 124 and the cleaning rollers 205a and 205b are removable from the body 200 as a unit so that the cleaning head 205 is easily interchangeable with a replacement cleaning head 205.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50.

Cliff sensors 134 (shown in FIG. 2A) can be located along a bottom portion of the body 200. Each of the cliff sensors 134 can be an optical sensor that can be configured to detect a presence or absence of an object below the optical sensor, such as the floor surface 50. The cliff sensors 134 can be connected to the controller 212. A bumper 138 can be removably secured to the body 200 and can be movable relative to body 200 while mounted thereto. In some examples, the bumper 138 form part of the body 200. The bumper sensors 139a and 139b (collectively referred to as the bumper sensors 139) can be connected to the body 200 and engageable or configured to interact with the bumper 138. The bumper sensors 139 may include break beam sensors, capacitive sensors, switches, or other sensors that can detect contact between the robot 100, i.e., the bumper 138, and objects in the environment. The bumper sensors 139 can be in communication with the controller 212.

An image capture device 140 can be a camera connected to the body 200 and can extend through the bumper 138 of the robot 100, such as through an opening 143 of the bumper 138. The image capture device 140 can be a camera, such as a front-facing camera, configured to generate a signal based on imagery of the environment of the robot 100 as the robot 100 moves about the floor surface 50. The image capture device 140 can transmit the signal to the controller 212 for use for navigation and cleaning routines.

Obstacle following sensors 141 (shown in FIG. 2B) may include an optical sensor facing outward from the bumper 138 and that can be configured to detect the presence or the absence of an object adjacent to a side of the body 200. The obstacle following sensor 141 can emit an optical beam horizontally in a direction perpendicular (or nearly perpendicular) to the forward drive direction of the robot 100. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

A side brush 142 can be connected to an underside of the robot 100 and can be connected to a motor 144 operable to rotate the side brush 142 with respect to the body 200 of the robot 100. The side brush 142 can be configured to engage debris to move the debris toward the cleaning head 205 or away from edges of the environment. The motor 144 configured to drive the side brush 142 can be in communication with the controller 112. The brush 142 can rotate about a non-horizontal axis, e.g., an axis forming an angle between 75 degrees and 90 degrees with the floor surface 50. The non-horizontal axis, for example, can form an angle between 75 degrees and 90 degrees with the longitudinal axes 126a and 126b of the rollers 205a and 205b.

The brush 142 can be a side brush laterally offset from a center of the robot 100 such that the brush 142 can extend beyond an outer perimeter of the body 200 of the robot 100. Similarly, the brush 142 can also be forwardly offset of a center of the robot 100 such that the brush 142 also extends beyond the bumper 138.

The robot 100 can also include a button 146 (or interface) that can be a user-operable interface configured to provide commands to the robot, such as to pause a mission, power on, power off, or return to a docking station.

In operation of some examples, the robot 100 can be propelled in a forward drive direction or a rearward drive direction. The robot 100 can also be propelled such that the robot 100 turns in place or turns while moving in the forward drive direction or the rearward drive direction.

When the controller 212 causes the robot 100 to perform a mission, the controller 212 can operate the motors 208 to drive the drive wheels 210 and propel the robot 100 along the floor surface 50. In addition, the controller 212 can operate the motors 214 to cause the rollers 205a and 205b to rotate, can operate the motor 144 to cause the brush 142 to rotate, and can operate the motor of the vacuum assembly 118 to generate airflow. The controller 212 can execute software stored on the memory 213 to cause the robot 100 to perform various navigational and cleaning behaviors by operating the various motors of the robot 100.

The various sensors of the robot 100 can be used to help the robot navigate and clean within the environment. For example, the cliff sensors 134 can detect obstacles such as drop-offs and cliffs below portions of the robot 100 where the cliff sensors 134 are disposed. The cliff sensors 134 can transmit signals to the controller 212 so that the controller 212 can redirect the robot 100 based on signals from the cliff sensors 134.

In some examples, a bumper sensor 139a can be used to detect movement of the bumper 138 along a fore-aft axis of the robot 100. A bumper sensor 139b can also be used to detect movement of the bumper 138 along one or more sides of the robot 100. The bumper sensors 139 can transmit signals to the controller 212 so that the controller 212 can redirect the robot 100 based on signals from the bumper sensors 139.

The image capture device 140 can be configured to generate a signal based on imagery of the environment of the robot 100 as the robot 100 moves about the floor surface 50. The image capture device 140 can transmit such a signal to the controller 212. The image capture device 140 can be angled in an upward direction, e.g., angled between 5 degrees and 45 degrees from the floor surface 50 about which the robot 100 navigates. The image capture device 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system may include an obstacle following sensor along a side surface, and the obstacle following sensor can detect the presence or the absence an object adjacent to the side surface. The one or more obstacle following sensors 141 can also serve as obstacle detection sensors, similar to the proximity sensors described herein.

The robot 100 can also include sensors for tracking a distance travelled by the robot 100. For example, the sensor system may include encoders associated with the motors 208 for the drive wheels 210, and the encoders can track a distance that the robot 100 has travelled. In some implementations, the sensor may include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 212 can use data collected by the sensors of the sensor system to control navigational behaviors of the robot 100 during the mission. For example, the controller 212 can use the sensor data collected by obstacle detection sensors of the robot 100, (the cliff sensors 134, the bumper sensors 139, and the image capture device 140) to enable the robot 100 to avoid obstacles within the environment of the robot 100 during the mission.

The sensor data can also be used by the controller 212 for simultaneous localization and mapping (SLAM) techniques in which the controller 212 extracts features of the environment represented by the sensor data and constructs a map of the floor surface 50 of the environment. The sensor data collected by the image capture device 140 can be used for techniques such as vision-based SLAM (VSLAM) in which the controller 212 extracts visual features corresponding to objects in the environment and constructs the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission may include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently dean the floor surface 50. For example, the map enables the controller 212 to direct the robot 100 toward open floor space and to avoid non-traversable space. In addition, for subsequent missions, the controller 212 can use the map to optimize paths taken during the missions to help plan navigation of the robot 100 through the environment.

FIG. 3 is a diagram illustrating an example of a control architecture 300 for operating a mobile cleaning robot. The controller 212 can be communicatively coupled to various subsystems of the mobile cleaning robot 100, including a communications system 305, a cleaning system 310, a drive system 110, and a sensor system 320. The controller 212 includes a memory 213 that holds data and instructions for processing by a processor 324. The processor 324 receives program instructions and feedback data from the memory 213, executes logical operations called for by the program instructions, and generates command signals for operating the respective subsystem components of the mobile cleaning robot 100. An input/output unit 326 transmits the command signals and receives feedback from the various illustrated components.

The communications system 305 may include a beacon communications module 306 and a wireless communications module 307. The beacon communications module 306 may be communicatively coupled to the controller 212. In some embodiments, the beacon communications module 306 is operable to send and receive signals to and from a remote device. For example, the beacon communications module 306 may detect a navigation signal projected from an emitter of a navigation or virtual wall beacon or a homing signal projected from the emitter of a dock. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 facilitates the communication of information describing a status of the mobile cleaning robot 100 over a suitable wireless network (e.g., a wireless local area network) with one or more mobile devices (e.g., mobile device 404 shown in FIG. 4A). More details of the communications system 305 are discussed below, such as with reference to FIG. 4A.

The cleaning system 310 may include the roller motor 214 (e.g., actuators 214a and 214b), a brush motor 144 driving the side brush 142, and a suction fan motor 316 powering the vacuum assembly 118. The cleaning system 310 further includes multiple motor sensors 317 that monitor operation of the roller motor 214, the brush motor 144, and the suction fan motor 316 to facilitate closed-loop control of the motors by the controller 212. In some embodiments, the roller motor 214 is operated by the controller 212 (or a suitable microcontroller) to drive the rollers (e.g., rollers 205a and 205b) according to a particular speed setting via a closed-loop pulse-width modulation (PWM) technique, where the feedback signal is received from a motor sensor 317 monitoring a signal indicative of the rotational speed of the roller motor 214. For example, such a motor sensor 317 may be provided in the form of a motor current sensor (e.g., a shunt resistor, a current-sensing transformer, and/or a Hall Effect current sensor)

The drive system 110 may include a drive-wheel motor 208 for operating the drive wheels 210 in response to drive commands or control signals from the controller 212, as well as multiple drive motor sensors 161 to facilitate closed-loop control of the drive wheels (e.g., via a suitable PWM technique as described above). In some implementations, a microcontroller assigned to the drive system 110 is configured to decipher drive commands having x, y, and θ components. The controller 212 may issue individual control signals to the drive-wheel motor 208. In any event, the controller 212 can maneuver the mobile cleaning robot 100 in any direction across a cleaning surface by independently controlling the rotational speed and direction of each drive wheel 212a or 210b via the drive-wheel motor 208.

The controller 212 can operate the drive system 110 in response to signals received from the sensor system 320. For example, the controller 212 may operate the drive system 110 to redirect the mobile cleaning robot 100 to avoid obstacles encountered while treating a floor surface. In another example, if the mobile cleaning robot 100 becomes stuck or entangled during use, the controller 212 may operate the drive system 110 according to one or more escape behaviors. To achieve reliable autonomous movement, the sensor system 320 may include several different types of sensors that can be used in combination with one another to allow the mobile cleaning robot 100 to make intelligent decisions about a particular environment, By way of example and not limitation, the sensor system 320 may include one or more of proximity sensors 336, the cliff sensors 134, a visual sensor 325 such as the image capture device 140 configured for detecting features and landmarks in the operating environment and building a virtual map, such as using VSLAM technology, as described above.

The sensor system 320 may further include bumper sensors 339 (such as the bumper sensors 139a and 139b), responsive to activation of the bumper 138. The sensor system 320 may include an inertial measurement unit (MU) 164 that is, in part, responsive to changes in position of the mobile cleaning robot 100 with respect to a vertical axis substantially perpendicular to the floor and senses when the mobile cleaning robot 100 is pitched at a floor type interface having a difference in height, which is potentially attributable to a flooring type change. In some examples, the IMU 164 is a six-axis MU having a gyro sensor that measures the angular velocity of the mobile cleaning robot 100 relative to the vertical axis. However, other suitable configurations are also contemplated. For example, the IMU 164 may include an accelerometer sensitive to the linear acceleration of the mobile cleaning robot 100 along the vertical axis. In any event, output from the IMU 164 is received by the controller 212 and processed to detect a discontinuity in the floor surface across which the mobile cleaning robot 100 is traveling. Within the context of the present disclosure the terms "flooring discontinuity" and "threshold" refer to any irregularity in the floor surface (e.g., a change in flooring type or change in elevation at a flooring interface) that is traversable by the mobile cleaning robot 100, but that causes a discrete vertical movement event (e.g., an upward or downward "bump"). The vertical movement event could refer to a part of the drive system (e.g., one of the drive wheels 210) or the chassis of the body 200, depending on the configuration and placement of the IMU 164. Detection of a flooring threshold, or flooring interface, may prompt the controller 212 to expect a change in floor type. For example, the mobile cleaning robot 100 may experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, may be incorporated in the sensor system 320 (or any other subsystem) without departing from the scope of the present disclosure. Such sensors may function as obstacle detection units, obstacle detection obstacle avoidance (ODOA) sensors, wheel drop sensors, obstacle-following sensors, stall-sensor units, drive-wheel encoder units, bumper sensors, and the like.

Example Communication Networks

FIG. 4A is a diagram illustrating by way of example and not limitation a communication network 400A that enables networking between the mobile cleaning robot 100 and one or more other devices, such as a mobile device 404, a cloud computing system 406, or another autonomous robot 408 separated from the mobile device 404. Using the communication network 400A, the mobile cleaning robot 100, the mobile device 404, the robot 408, and the cloud computing system 406 can communicate with one another to transmit data to one another and receive data from one another. In some implementations, the mobile cleaning robot 100, the robot 408, or both the mobile cleaning robot 100 and the robot 408 communicate with the mobile device 404 through the cloud computing system 406. Alternatively or additionally, the mobile cleaning robot 100, the robot 408, or both the mobile cleaning robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 400A.

In some implementations, the mobile device 404 as shown in FIG. 4A is a remote device that can be linked to the cloud computing system 406, and can enable a user to provide inputs on the mobile device 404. The mobile device 404 may include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile device 404. In such cases, the mobile device 404 transmits a signal to the cloud computing system 406 to cause the cloud computing system 406 to transmit a command signal to the mobile cleaning robot 100. In some implementations, the mobile device 404 can present augmented reality images. In some implementations, the mobile device 404 is a smart phone, a laptop computer, a tablet computing device, or other mobile device.

According to various embodiments discussed herein, the mobile device 404 may include a user interface configured to display a map of the robot environment. Robot path, such as that identified by the coverage planner of the controller 212, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 400A may include additional nodes. For example, nodes of the communication network 400A may include additional robots. Alternatively or additionally, nodes of the communication network 400A may include network-connected devices. In some implementations, a network-connected device can generate information about, the environment. The network-connected device may include one or more sensors to detect features in the environment, such as an acoustic sensor, an image capture system, or other sensor generating signals from which features can be extracted. Network-connected devices may include home cameras, smart sensors, smart locks, smart thermostats, smart garage door openers, and the like.

In the communication network 400A depicted in FIG. 4A and in other implementations of the communication network 400A, the wireless links may utilize various communication schemes, protocols, etc., such as, for example, Bluetooth classes, Wi-Fi. Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Figure 4B:
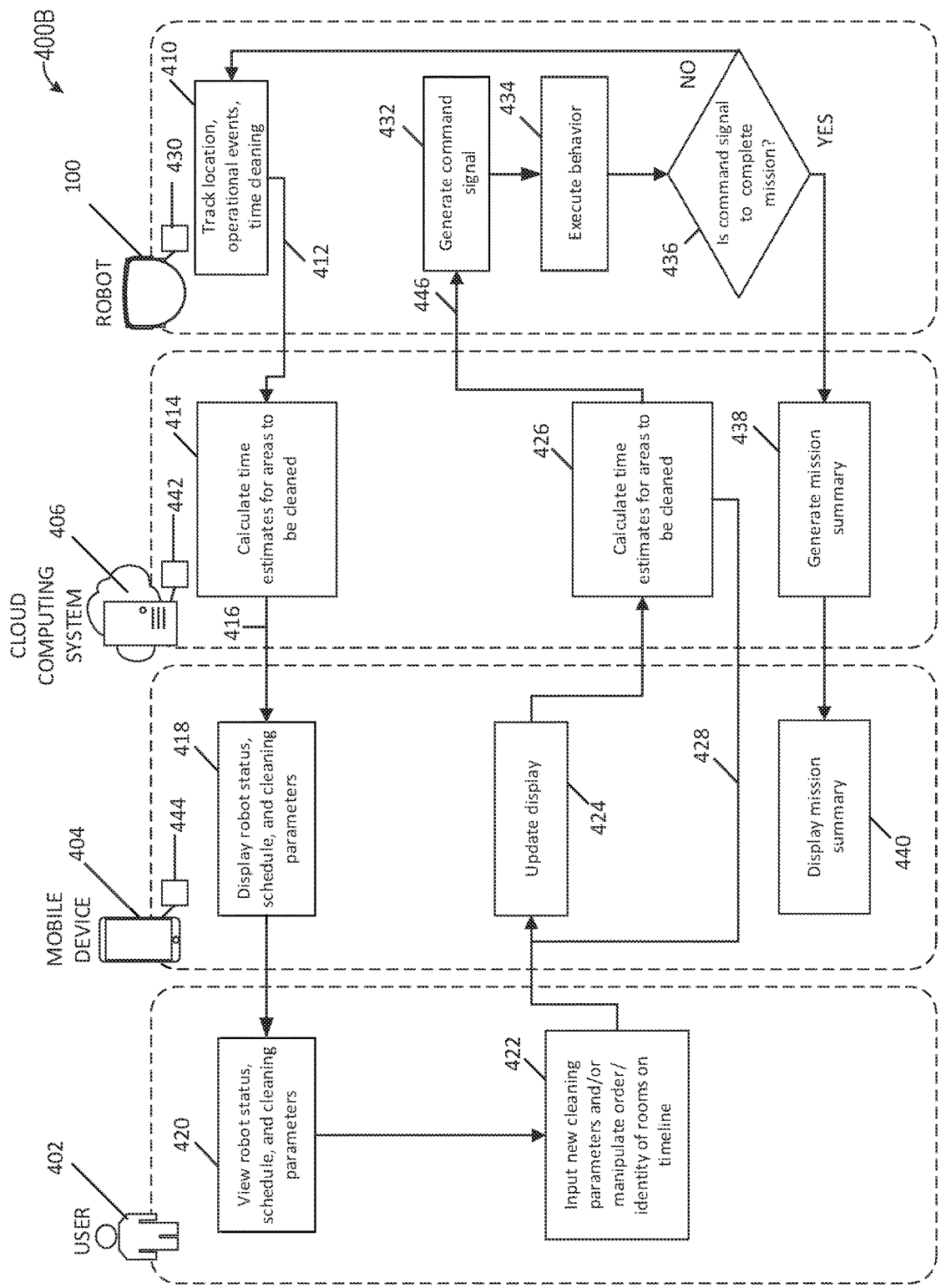
FIG. 4B is a diagram illustrating an exemplary process of exchanging information between the mobile robot and other devices in a communication network.

FIG. 4B is a diagram illustrating an exemplary process 400B of exchanging information among devices in the communication network 400A, including the mobile cleaning robot 100, the cloud computing system 406, and the mobile device 404. A cleaning mission may be initiated by pressing a button on the mobile cleaning robot 100 or may be scheduled for a future time or day. The user may select a set of rooms to be cleaned during the cleaning mission, select a set of areas or zones within a room, or may instruct the robot to clean all rooms. The user may also select a set of cleaning parameters to be used in each room during the cleaning mission.

During a cleaning mission, the mobile cleaning robot 100 tracks 410 its status, including its location, any operational events occurring during cleaning, and a time spent cleaning. The mobile cleaning robot 100 transmits 412 status data (e.g. one or more of location data, operational event data, time data) to a cloud computing system 406, which calculates 414, by a processor 442, time estimates for areas to be cleaned. For example, a time estimate could be calculated for a cleaning room by averaging the actual cleaning times for the room that have been gathered during multiple (e.g. two or more) prior cleaning missions for the room. The cloud computing system 406 transmits 416 time estimate data along with robot status data to a mobile device 404. The mobile device 404 presents 418, by a processor 444, the robot status data and time estimate data on a display. The robot status data and time estimate data may be presented on the display of the mobile device as any of a number of graphical representations editable mission timeline and/or a mapping interface. In some examples, the mobile cleaning robot 100 can communicate directly with the mobile device 404.

A user 402 views 420 the robot status data and time estimate data on the display and may input 422 new cleaning parameters or may manipulate the order or identity of rooms to be cleaned. The user 402, may, for example, delete rooms from a cleaning schedule of the mobile cleaning robot 100. In other instances, the user 402, may, for example, select an edge cleaning mode or a deep clean mode for a room to be cleaned. The display of the mobile device 404 is updates 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates 426 time estimates for areas to be cleaned, which are then transmitted 428 (e.g. by a wireless transmission, by applying a protocol, by broadcasting a wireless transmission) back to the mobile device 404 and displayed. Additionally, data relating to the calculated time estimates are transmitted 446 to a controller 430 of the robot. Based on the inputs from the user 402, which are received by the controller 430 of the mobile cleaning robot 100, the controller 430 generates 432 a command signal. The command signal commands the mobile cleaning robot 100 to execute 434 a behavior, which may be a cleaning behavior. As the cleaning behavior is executed, the controller continues to track 410 the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing 434 a behavior, the controller 430 checks 436 to see if the received command signal includes a command to complete the cleaning mission. If the command signal includes a command to complete the cleaning mission, the robot is commanded to return to the dock and, upon return sends information to enable the cloud computing system 406 to generate 438 a mission summary which is transmitted to, and displayed 440 by, the mobile device 404. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 400B and other processes described herein can be executed in a distributed manner. For example, the cloud computing system 406, the mobile cleaning robot 100, and the mobile device 404 may execute one or more of the operations in concert with one another. Operations described as executed by one of the cloud computing system 406, the mobile cleaning robot 100, and the mobile device 404 are, in some implementations, executed at least in part by two or all of the cloud computing system 406, the mobile cleaning robot 100, and the mobile device 404.

Example Seasonal Cleaning Schedules and Cleaning Control

Discussed in the following with reference to FIGS. 5-10 are various embodiments of systems, devices, and methods for creating a seasonal cleaning schedule for an autonomous mobile robot, and controlling the autonomous mobile robot to execute a mission in an environment in accordance with the seasonal cleaning schedule. The seasonal cleaning schedule can be based on a seasonal or environmental debris accumulation event. While this document makes reference to the mobile cleaning robot 100 that performs floor cleaning, the seasonal cleaning schedules discussed herein can be used in robots designed for different applications, such as mopping, mowing, transporting, among others. Additionally, while some components, modules, and operations may be described as being implemented in and performed by the mobile cleaning robot 100, by a user, by a computing device, or by another actor, these operations may, in some implementations, be performed by actors other than those described. For example, an operation performed by the mobile cleaning robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile cleaning robot 100. In some implementations, the mobile cleaning robot 100 can perform, in addition to the operations described as being performed by the mobile cleaning robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Figure 5:
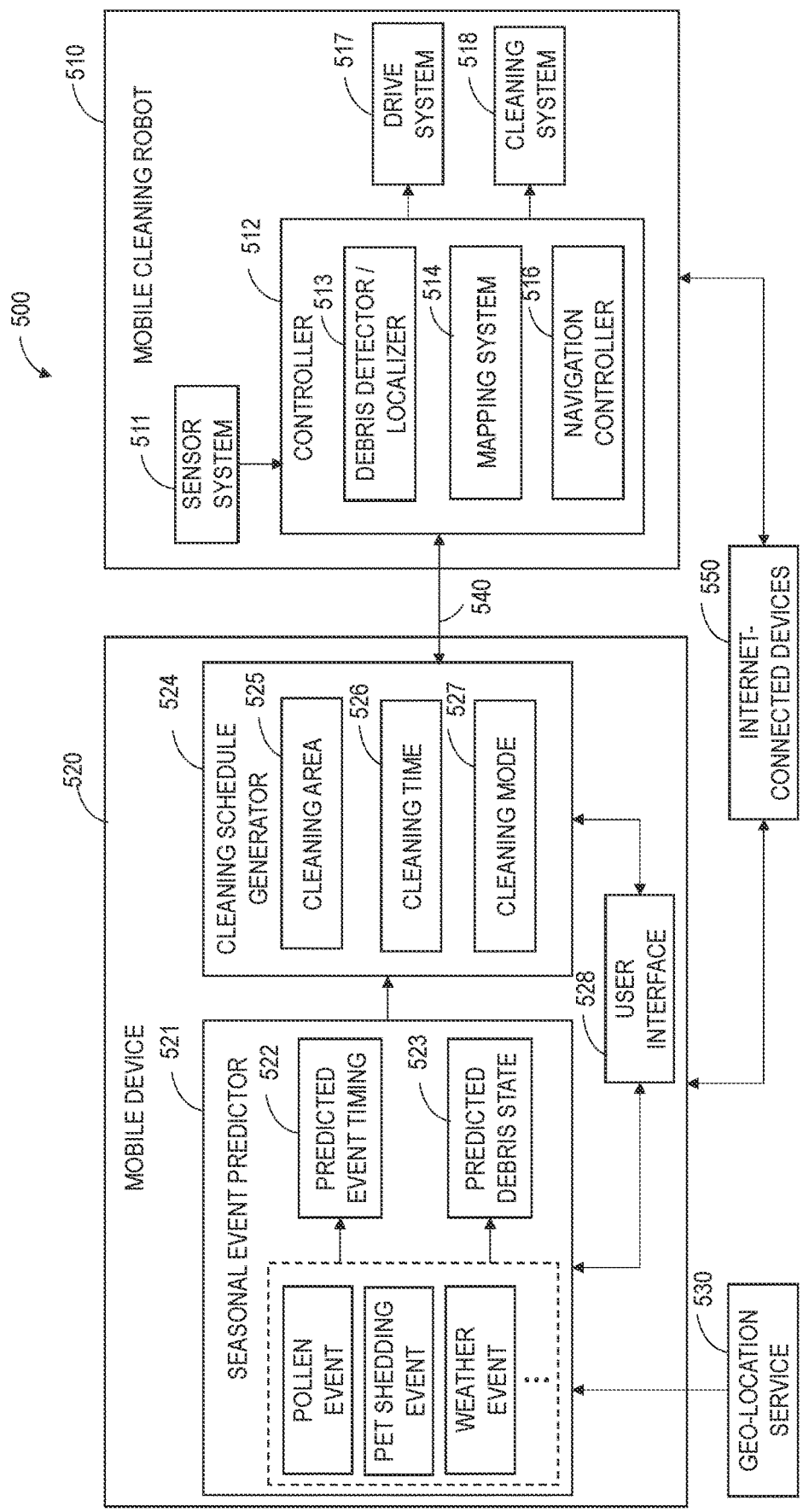
FIG. 5 is a block diagram illustrating an example of a mobile robot system to generate a seasonal cleaning schedule and clean the environment in accordance with the seasonal cleaning schedule.

FIG. 5 is a block diagram illustrating an example of a mobile robot system 500 for creating a seasonal cleaning schedule for a mobile cleaning robot (e.g., the mobile cleaning robot 100), and conducting a cleaning mission in accordance with the seasonal cleaning schedule. The seasonal cleaning schedule can be a modification of an existing "default" or regular cleaning schedule to accommodate increased debris accumulation during a seasonal or environmental debris accumulation event. Examples of the seasonal debris accumulation event may include pollen production during a pollen season, increased pet shedding during a shedding season, or an environmental or weather event such as mud, rain, or snow being tracked into certain areas of a home in a rainy season or a snowy season. The seasonal cleaning schedule can be a one-time change of schedule. Alternatively, the seasonal cleaning schedule may include a regularly scheduled cleaning change, or a regularly scheduled cleaning that extends over the season or a user-specified time period. The seasonal cleaning schedule may be used by one or more mobile robots of the same or different types, such as mobile cleaning robots, mobile mopping robots, or mowing robots.

While this document makes reference to pollen and cleaning schedules based on seasonal pollen production, the systems and methods discussed in the present document may also be used to create cleaning schedules for a mobile robot based on projected or detected events associated with other particulate matter, such as common air pollutants, particulates produced due to forest fires or dust storms, etc.

The mobile robot system 500 may include a mobile cleaning robot 510 and a mobile device 520. The mobile cleaning robot 510, an example of the mobile cleaning robot 100, may include a sensor system 511, a controller 512, a drive system 517, and a cleaning system 518. The controller 512 can receive a seasonal cleaning schedule from, for example, the mobile device 520. The seasonal cleaning schedule corresponds to a seasonal debris accumulation event in the mobile cleaning robot's environment (e.g., the user's home). The seasonal debris accumulation event may change the rate of debris accumulation in the environment at different times of a year. The seasonal cleaning schedule includes instructions to the mobile cleaning robot 510 to clean a portion of the environment with a debris state varied seasonally (hereinafter referred to as a seasonal debris state). The seasonal debris state represents an anticipated level of debris accumulation, such as a high debris state, a low debris state, or a debris-free state. The controller 512 can generate a control signal to the drive system 517 and the cleaning system 518 to execute a cleaning mission in the environment in accordance with the seasonal cleaning schedule.

The mobile device 520, which is an example of the mobile device 404, can be communicatively coupled to the mobile cleaning robot 510 via a communication link 540. Examples of the mobile device 520 may include a smart phone, personal computer, smartwatch, mobile tablet, among other mobile computing devices. The mobile device 520 may include a processor for executing routines, a memory, a wireless communication interface to communicate with other devices including, for example, the mobile cleaning robot 510, an internet-connected device 550, and a display and/or a touchscreen. The processor of the mobile device 520 may include a seasonal event predictor 521 and a cleaning schedule generator 524. The seasonal event predictor 521 can determine or predict occurrence and timing of a seasonal debris accumulation event such as pollen production, increased pet shedding, or an environmental or weather event such as mud, rain, or snow being tracked into certain areas of a home.

Predicting Timing of a Seasonal Debris Accumulation Event

The seasonal event predictor 521 can predict timing of a seasonal debris accumulation event based on a geographical location of the mobile cleaning robot's environment (e.g., the user's home). Information about the geographical location of the mobile robot's environment can be obtained from a geo-location service 530 that uses global positioning system (GPS) or other location technologies. The geo-location service 530 can be separated from the mobile device 520, or it can be included in the mobile device 520. Alternatively, the geographical location of the mobile robot's environment can be provided by a user, such as via the user interface 528 of the mobile device 520.

Based on the geographical location of the mobile robot's environment, the seasonal event predictor 521 can determine a predicted timing 522 of the seasonal debris accumulation event. The predicted timing 522 may include, for example, an anticipated timespan (beginning and end time) of the seasonal debris accumulation event in a typical year. The timespan can be based on historical event data collected over an extended period of time with respect to the geographical location of the mobile robot's environment. By way of example and not limitation, the timespan of a pollen season can be from March to June, a dog-shedding season from March to June and from September to November, or a rainy season from April to June.

In some examples, the seasonal event predictor 521 may search the internet for a seasonal debris accumulation event of a particular kind and its seasonal variation at different geographical regions, and use such information to determine the predicted timing 522, such as a timespan, for the seasonal debris accumulation event in a typical year with respect to the geographical region of the user's home. The searching can be done through a search engine included in the mobile device 520, or through an internet-connected device 550 communicatively coupled to the mobile device 520. The internet-connected device 550 can be smart home devices or Internet-of-Things (IoT) devices. In some examples, the internet-connected device 550 can be a smart home ecosystem that uses a virtual assistant capable of communicating with a user, and searching for the predicted timing 522 of a particular seasonal debris accumulation event in response to the user's request.

In some examples, the Internet-connected device 550 includes IoT devices or sensors in the user's home (e.g., HVAC, humidifier, or air purifier) that can detect pollen or other airborne particulates. Information acquired by the internet-connected device 550 can be transmitted to the mobile device 520 and displayed to the user, and used for generating a seasonal cleaning schedule.

In addition or alternative to the geographical location of the mobile cleaning robot's environment, other information may be used to predict the timing of a seasonal debris accumulation event. In an example, the mobile device 520 may request a forecast of an upcoming environmental event from a weather service, such as rain, wind, snow, pollen index, mold count, among others. The request can be generated automatically by the mobile device 520, or alternatively initiated by a user such as via the user interface 528. Such a request can be made through the internet using the search engine included in the mobile device 520 or using the internet-connected device 550. The forecast of the upcoming environment event may be used for determining the predicted timing 522 of a seasonal pollen event or a weather event, which may in turn be used to generate a seasonal cleaning schedule. The forecast of an upcoming environment event and the predicted timespan of the seasonal debris accumulation event can be displayed to the user on the user interface 528 of the mobile device 520.

In another example, while the fall and spring months are the peak shedding times for dogs, the exact shedding months may vary depending on the weather, amount of daylight, breed of dog, nutrition, age, sex, living environment and overall health condition. In an example, the seasonal event predictor 521 can determine the predicted timing 522 of dog shedding based on pet information. The pet information may be provided by the user such as via the user interface 528, example of which is discussed below with reference to FIGS. 7A-7C. Additionally or alternatively, the pet information may be automatically determined. For example, images of a pet can be captured by a camera on the mobile cleaning robot 510 or the mobile device 520, and compared to those in known databases to automatically determine breed, type, approximate size, or approximate weight, among other pet information. In an example, the mobile cleaning robot 510 can detect pet presence and pet information dynamically as it traverses the environment, as discussed in the following.

Predicting Debris State in an Area

The seasonal event predictor 521 can predict a seasonal debris state 523. The predicted seasonal debris state indicates a level of debris accumulation in the user's home or a portion thereof. Examples of the debris state may include a high debris state, a low debris state, or a debris-free state, among others. While the predicted event timing 522 (such as timespan of pollen production, pet shedding, or rainy season) is largely dependent on the geographical locations of the user's home, the predicted debris state 523 can be more affected by environmental conditions specific to the user's home. For example, the seasonal event predictor 521 can determine a predicted pollen accumulation state based on quantities and varieties of plants in the area of the user's home, and/or the distances or orientations of the plants relative to the user's home. The specific environmental conditions may be used to determine or predict amount of pollen or pollen distribution in different areas of the user's home during a pollen season. In another example, the seasonal event predictor 521 can determine the predicted pet hair amount based on pet information such as the number of pets in the household, and breed, type, age, approximate weight of each pet. The pet information may be used to determine or predict an amount of pet hair in the environment during the shedding season. The predicted debris state 523, along with the predicted timing 522 of the seasonal debris accumulation event, may be used to generate a seasonal cleaning schedule.

Creating a Seasonal Cleaning Schedule Recommendation

The cleaning schedule generator 524 can generate a recommendation of a seasonal cleaning schedule for the mobile cleaning robot 510 based on one or more of the predicted timing 522 or the predicted debris state 523 of a seasonal debris accumulation event. The seasonal cleaning schedule includes one or more of cleaning area 525 (e.g., certain room(s) or portions thereof in the mobile robot user's home), cleaning time 526, or cleaning mode 527. The cleaning area 525 can be the entire environment (e.g., user's home) or a portion thereof such as specified by a user. The cleaning area 525 may have different seasonal debris state at different times of a year. As stated above, a seasonal debris state represents a level debris accumulation in certain areas of the cleaning environment. Those areas are expected to have a higher debris state during the predicted timespan of the seasonal debris accumulation event, and a relatively lower debris state in other times outside the timespan. For example, pollen accumulation is likely higher during a pollen season than other times of the year. Excess dog hair is likely present in certain areas of the home during a shedding season than other times of the year. Mud and rain are more likely to accumulate in certain areas of the home during a rainy season than the dry months of the year. As discussed in the following, the cleaning area 525 can be dynamically determined or updated as the mobile cleaning robot 510 traverses the environment and detects therein debris accumulation or objects proximal to areas more likely to be affected by seasonal debris (e.g., areas in proximity to windows and entry doors prone to pollen buildup, or areas where pets or pet utilities are detected that are prone to excess pet hair during a shedding season), as discussed in the following.

The cleaning time 526 may include specific days and times within the predicted timing 522. For example, the cleaning time 526 can be defined as 9:00 a.m. on Monday, Wednesday, and Friday every week during the predicted timespan of the seasonal debris accumulation event determined by the seasonal event predictor 521. The cleaning mode 527 represents how the mobile cleaning robot 510 cleans a cleaning area. For a cleaning schedule that involves multiple cleaning areas, each cleaning area may be cleaned with a corresponding cleaning mode. The cleaning mode 527 can differ in the number of passes over the same area (e.g., single pass versus multiple passes), time spent to clean an area, cleaning power, etc. Examples of the cleaning mode 527 may include deep clean, spot clean, quick clean, vacuum followed by mopping, among others.

For a particular cleaning area, the seasonal cleaning schedule can vary in cleaning time 526, cleaning mode 527, or both based on the predicted debris state of that area. For example, the seasonal cleaning schedule may include a first cleaning time (e.g. Monday through Friday every week during the pollen season or dog-shedding season) for cleaning the area when it is projected to have a relatively high debris state, such as during a peak pollen season or pet-shedding season. The seasonal cleaning schedule may include a different second cleaning time (e.g., only every Monday and Thursday out of the pollen season, or out of the dog-shedding season) for cleaning the same area when it is projected to have a relatively low debris state, such as during times off the pollen season or pet-shedding season. In another example, the seasonal cleaning schedule may include a first cleaning mode (e.g., a "deep clean" mode characterized by repeated or multi-pass cleaning over the same area, a longer cleaning time, or a higher power) when the area is projected to have a relatively high debris state, and a different second cleaning mode (e.g., a "standard clean" mode or a "quick clean" mode characterized by a single or less pass over a same area, a shorter cleaning time, or a lower cleaning power) when the area is projected to have a relatively low debris state.

The seasonal cleaning schedule can be presented to the user, such as on a display of the user interface 528. The user can accept, decline, or modify the recommended seasonal cleaning schedule or a portion thereof, such as via UI controls on the user interface 528. For example, the user can add more time to the recommended cleaning time 526, add more cleaning passes to the recommended cleaning mode 527, or changing the location or size of the recommended cleaning area 525. The user may make such changes to the recommended cleaning schedule based on the user's observation of the environment, detections performed by the mobile cleaning robot (e.g., detection of debris as discussed in the following), or user's personal preference or health conditions (e.g., allergic reaction to pollens or other allergens). The seasonal cleaning schedule, if accepted or as modified by the user, can be stored in a memory of the mobile device 520, and used by the mobile cleaning robot 510 when executing a cleaning mission.

The seasonal cleaning schedule can be displayed on the user interface 528. In some examples, information about the seasonal or environmental debris accumulation events, such as the predicted timing 522 (e.g., the timespan) and the predicted debris state 523 of a seasonal debris accumulation event may be displayed on the user interface 528. The user can use such information as a reference to customize the seasonal cleaning schedule.

In some examples, various recommendations may be displayed on the user interface 528 to guide the user to clean the affected area or reduce the impact of the pollen accumulation. In an example, a recommendation can be provided to close the windows of the home when the daily pollen level is forecast to be relatively high. In an example where the windows are electronically controllable, the windows can be automatically closed with permission of the user. As discussed in the following, the mobile cleaning robot 510 may include a sensor system 511 to detect and localize actual debris accumulation levels in the environment. In an example, a notification of excess debris accumulation may be presented to the user when the detected debris levels exceed a debris threshold. In an example, the debris threshold is adjustable by a user through the user interface. A recommendation can be provided to the user to clean the identified debris accumulation area when the detected debris level exceeds the debris threshold.

Examples of creating a seasonal cleaning schedule on the mobile device 520 are illustrated in FIGS. 6A-6C and FIGS. 7A-7B. FIG. 6A shows a wireframe of a user interface 600A on a mobile device, such as a smart phone. The mobile device can execute a mobile application ("app") to allow a user to control the operation of a mobile cleaning robot in the user's home. A notification page displayed on the user interface may include, among other functions, seasonal recommendations 610 that can assist the user in setting up a seasonal cleaning schedule taking into consideration the seasonal or environmental events such as pollen production, pet-shedding, or weather events. The user may use a toggle switch 612 to activate the seasonal recommendation 610. FIG. 6B illustrates a schedule page 600B showing recommended seasonal cleaning tasks automatically generated by the cleaning schedule generator 524 based on the seasonal or environmental debris accumulation events. The recommended seasonal cleaning schedule can be a separate schedule than an existing "default" or regular cleaning schedule not taking into account the seasonal or environmental debris accumulation events. Alternatively, the recommended seasonal cleaning schedule can be a modification of the existing cleaning schedule, such as by adding extra cleaning tasks to the existing cleaning schedule. As illustrated in FIG. 6B, the existing cleaning schedule 620 defines times for cleaning designated areas in the user's home (e.g., one-time event on Thursday at 9:00 a.m., and recurring events every Monday, Wednesday and Friday "when I leave home"). To accommodate seasonal or environmental debris accumulation events such as pollen or pet shedding, one or more extra cleaning times 622 (e.g., Mondays at 9:00 a.m. and Wednesdays at 3:00 p.m.) are recommended to the user. The extra cleaning time can be a one-time cleaning, or a recurrently scheduled cleaning. The user can add the recommended extra cleaning times 622 to the existing schedule, such as via a UI control 624.

As discussed above, the cleaning time 526 and cleaning mode 527 each determine the amount of extra cleaning to perform on those areas with seasonal debris accumulation. In addition or alternative to the recommended extra cleaning times 622, extra cleaning can involve a recommendation of a different or a modified cleaning mode to accommodate increased pollen accumulation or excess pet hair. In an example, a modified cleaning mode may include mopping more frequently to ensure collection of the fine pollen particles. For example, a recommendation can be provided to mop the floor after each vacuuming mission during the time period with relatively high pollen levels. In an example, mopping can be recommended before vacuuming, or without vacuuming to prevent or reduce pollen being dispersed into the air via vacuuming. In an example where a user co-cleans with the robot (e.g., the user dusts or does other cleaning chores while the robot vacuums or mops), a recommendation can be provided to the user to not dust when pollen or other airborne particulate matter is relatively high.

FIG. 6C is wireframe of a user interface 6000 illustrating the resulting seasonal cleaning schedule that incorporates the recommended extra cleaning times 622 into the existing cleaning schedule 620. Cleaning tasks directed to seasonal or environmental debris accumulation events can be marked or otherwise identified (e.g., "for pollen") in the cleaning schedule to be distinguishable from other cleaning tasks. Effective time of such seasonal cleaning tasks, which can be based on the projected timespan of the seasonal or environmental debris accumulation events, may also be displayed on the user interface (e.g., "ends on 9/20"). The user can accept or decline the seasonal cleaning schedule or a portion thereof, such as via UI controls 630. If accepted, the cleaning schedule for the mobile cleaning robot can be updated in accordance with the recommendation.

In some examples, the user may customize the seasonal cleaning schedule by adding, removing, or modifying (e.g., changing the date and/or time of cleaning) one or more cleaning tasks in the recommended extra cleaning times 622, and/or one or more cleaning tasks in the existing cleaning schedule 620. For example, the user may select only the "Monday at 9:00 a.m." from the recommended extra cleaning times 622 to be included in the seasonal cleaning schedule, or only the recurring events every Monday, Wednesday and Friday "when I leave home" from the existing cleaning schedule 620 to be included in the seasonal cleaning schedule.

FIGS. 7A-7B are wireframes of a user interface of a mobile device (e.g., a smart phone) for creating a seasonal cleaning schedule based on pet-shedding events. As discussed above, the seasonal event predictor 521 can determine timing (e.g., a timespan) of a pet-shedding season based on the geographical location of the environment and pet information including, for example, age, breed, sex, or weight of the pet. The pet information may also be used to an determine a predicted debris state at certain areas of the user's home. FIG. 7A shows an inquiry page 700A on a user interface prompting the user to provide pet information including, for example, pet presence 712, number of pets 714, and type, weight, breed, age for each pet 716. FIG. 713 illustrates a schedule page 700B showing recommended seasonal cleaning tasks automatically generated by the cleaning schedule generator 524 based on the pet information received from the user, optional along with information about the geographical location of the user's home. Similar to the schedule page 600B shown in FIG. 6B, the user can create a customized seasonal cleaning schedule by modifying an existing schedule 720, such as by adding extra cleaning times 722 using an UI control 724. The extra cleaning times 722 can be determined based on the pet information. For example, a first amount of extra cleaning time can be performed for a household having one small dog, and a second amount of extra cleaning can be performed for a household having two large dogs, where the second amount of extra cleaning is larger than the first amount of cleaning. Additionally or alternatively, the cleaning schedule generator 524 can determine a recommended cleaning mode based on the pet information, such as a recommendation of a "deep clean" mode, adding extra passes, moving the robot at a slower speed, or using at a higher power, for cleaning the pet-shedding areas. For example, the recommended cleaning mode may include changing the normal single-pass cleaning to two, three, or four passes.

FIG. 7C is wireframe of a user interface 700C illustrating the resulting seasonal cleaning schedule. Similar to the seasonal cleaning schedule shown in FIG. 6C, the cleaning tasks directed to pet-shedding events can be marked or otherwise identified (e.g., "for pet shedding") in the cleaning schedule to be distinguishable from other cleaning tasks. The effective time of such seasonal cleaning tasks may be displayed on the user interface (e.g., "ends on 9/1"). The user can accept or decline the recommended seasonal cleaning schedule or a portion thereof, such as via UI controls 730. If accepted, the cleaning schedule for the mobile cleaning robot can be updated in accordance with the recommendation.

Dynamic Adjustment of Cleaning Areas and Amount of Cleaning

Referring back to FIG. 5, the seasonal cleaning schedule created by the mobile device 520, such as that shown in FIG. 6C or 7C, can be transmitted to the mobile cleaning robot 510 via the communication link 540. The controller 512 of the mobile cleaning robot 510 may include a debris detector/localizer 513, a mapping system 514, and a navigation controller 516. As discussed above, the seasonal cleaning schedule generated by the cleaning schedule generator 524 may include the cleaning area 525. The cleaning area 525 may be the same area as defined in an existing cleaning schedule (e.g., the existing cleaning schedule 620 as shown in FIG. 6B or the existing schedule 720 as shown in FIG. 7B). Alternatively, a user may define the cleaning area 525, such as by modifying the existing cleaning area on the user interface 528.

In some examples, the cleaning area 525 can be dynamically determined or modified by the debris detector/localizer 513 as the mobile cleaning robot 510 traverses the environment and detects those areas with seasonal debris accumulation. The debris detector/localizer 513 can be coupled to a sensor system 511, an example of the sensor system 320, to detect a seasonal debris accumulation event in the user's home, such as pollen accumulation, excess pet hair, or mud presence. In some examples, the mobile cleaning robot 510 can use the sensor system 511 to detect objects in the user's home including, for example, entry doors, windows, pets or pet utilities (e.g., pet toy, bed, feeder, tools etc.). The controller 512 can use the presence of such objects and their locations in the user's home to determine or refine the cleaning area 525 in the seasonal cleaning schedule. Additionally or alternatively, the controller 512 can use the presence and locations of such objects to dynamically determine or refine the amount of cleaning to be performed in those areas, such as the cleaning time 526 or the cleaning mode 527 in the seasonal cleaning schedule.

In an example, the debris detector/localizer 513 can detect and localize a pollen area in the environment using one or more sensors configured to sense the presence and density of pollen or other airborne particulate matter. In an example, the sensor system 511 includes a forward facing camera that can inspect the floor surfaces of the user's home. The pollen accumulation can be detected based on the images captured by the camera. In another example, the sensor system 511 includes an optical sensor to sense light scattering produced by pollen or other airborne particulates. In some examples, the sensor system 511 may include sensors (e.g., camera or optical sensors as discussed above) to detect other particulate matter in the environment where a mobile cleaning robot operates, such as common air pollutants, particulates produced by forest fires or dust storm, etc. In some examples, the sensor system 511 may include chemical sensors to detect gas sulphur oxides (SOx), nitrogen oxides (NOx), volatile organic compounds (VOCs), carbon monoxide (CO) and ammonia ($NH_3$), ground-level ozone ($O_3$), etc.

As pollen is more likely to present and accumulate in areas proximate to an opening (e.g., entry way, windows, doors, air conditioners, vents) than other areas (e.g., under the bed, bathroom, or a closet), in some examples, the debris detector/localizer 513 can detect and localize an opening in the user's home, such as by using a camera included in the sensor system 511. The debris detector/localizer 513 can recognize the areas adjacent to the detected opening structure to be the anticipated pollen area. Alternatively, a user can identify or label the doors, windows, or other openings on a map of the environment created by the mapping system 514 of the mobile cleaning robot, as discussed in the following. The mobile cleaning robot can execute a cleaning mission including cleaning the areas adjacent to the user-identified openings.

In some examples, the size of the anticipated pollen area can be adjusted based on environmental or weather conditions in the area where the user's home is located. For example, the mobile device 520 can receive information about current wind conditions provided by a weather service and accessed via the internet-connected device 550. The controller 512 of the mobile cleaning robot 510 can receive from the mobile device 520 the current wind condition, and create a relatively larger zone around the windows or doors from which the pollen would enter for a relatively higher expected wind speed, or a relatively smaller zone around the windows or doors for a relatively lower expected wind speed. In an example, the size of the anticipated pollen area adjacent to the windows and doors can be based on an average of wind conditions during the pollen season.

In some examples, the size of the anticipated pollen area can be determined based on the quantities or varieties of plants (trees, weeds, or grasses) near the user's home, and the distance and relative location of the plants with respect to the windows and entry doors. For example, for a house in or near the woods or around trees that tend to produce heavy allergenic tree pollens, the controller 512 can create relatively larger zones around the doors and windows. In another example, the controller 512 can create a larger pollen zone adjacent to a window on a side of the house closer to trees than areas adjacent to a window on a different side of the house with very few trees nearby. Dynamic adjustment of the anticipated pollen area as described herein can improve the cleaning efficiency and enhance the user's experience with personalized cleaning.

In an example, the debris detector/localizer 513 can detect and localize an area of excess pet hair in the environment using the sensor system 511, such as an imaging sensor (e.g., a camera). In an example, the controller 512 can detect the presence of one or more pets using the sensor system 511, such as a camera. The controller 512 may run a pattern recognition algorithm to determine pet information such as number of pets in the household, and their breed, type, age, and approximate weight. In some examples, the controller 512 can detect a pet utility in the environment, such as a pet toy, bed, feeder, or tools. The debris detector/localizer 513 can determine the pet shedding area based on the detections of pet presence or the pet utilities. The pet information as detected and recognized by the controller 512 can be a substitute of the user input of the pet information as shown in FIG. 7A if, for example, the user input is not available or incomplete, or to augment the user provided pet information. Such pet information can be used to determine extra cleaning time or cleaning modes to be included in the seasonal cleaning schedule.

In an example, the debris detector/localizer 513 can detect and localize a weather event, such as excess mud in the user's home during a rainy season, using the sensor system 511, such as an imaging sensor (e.g., a camera). In an example, the controller 512 can identify certain areas or structure such as exterior doors or mudrooms where the areas nearby are projected to be muddy during the rainy season. Alternatively, a user can be prompted to identify or label the exterior doors or the mudrooms on a map of the environment created by the mapping system 514 of the mobile cleaning robot, as discussed in the following. During a period of predicted rainy weather, a recommendation can be provided to clean areas proximate to the exterior doors or mudrooms. The recommendation can be a one-time change of schedule, or recurrent cleaning schedule change. For example, the recommendation may include mopping the muddy areas within a specified time after the predicted rain ends. In an example, where rain is expected for a number of consecutive days, a regularly scheduled cleaning can be recommended to the user to provide extra cleaning during those days. A specific cleaning mode (e.g., a "deep clean") can be recommended for the muddy areas.

In some examples, the mobile robot system 500 may include sensors external to the mobile cleaning robot 510 that are configured to sense pollen or other particulates, pet hair, mud, or other debris or objects of interest. The external sensors can be mounted in actuatable environmental control nodes, or devices, that operate to control environmental conditions, such as humidifiers, HVAC, thermostats, or air purifiers. In an example, one or more such externals sensors can be included in the internet-connected device 550, such as IoT devices or sensors that can transmit the sensed information to the mobile cleaning robot 510 or the mobile device 520 via a wireless communication network. The mobile cleaning robot 510 can use the sensed information from the external sensors, optionally along with the information sensed by the sensor system 511, to dynamically modify one or more of the cleaning area 525, the cleaning time 526, or the cleaning mode 527 in a seasonal cleaning schedule.

Environment Map and Debris/Object Heat Map

The mobile cleaning robot 510 may include a mapping system 514 that can generate a map of the environment. The map can be created using sensor data collected by sensors in the sensor system 511, such as an imaging sensor. The map can indicate locations of traversable and non-traversable space within the environment. For example, locations of obstacles can be indicated on the map as non-traversable space, and locations of open floor space can be indicated on the map as traversable space. In an example, the mapping system 514 can generate semantic information for an object detected in the environment by the mobile cleaning robot 510. Examples of the semantic information may include location, an identity, or a state of an object in the environment, or constraints of spatial relationship between objects, among other object or inter-object characteristics. The semantically annotated object may be graphically displayed on the map. The map of the environment can be display on the user interface 528 of the mobile device 520. In an example, the user can use input devices (e.g., UI controls on the user interface 528) to make annotations on the map to indicate areas where the seasonal debris (e.g., pollen, pet hair, or mud) are anticipated to accumulate, or areas where certain objects of interest (e.g., entry doors, windows, pets or pet utilities) are located.

Figure 8A:
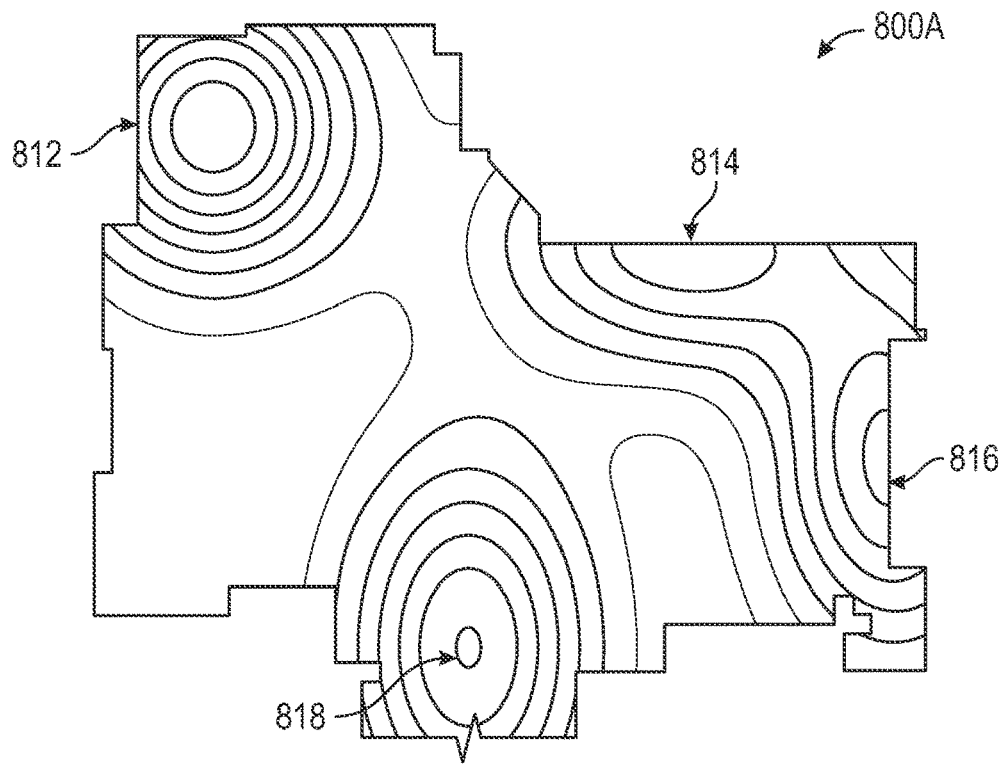
FIGS. 8A-8B are diagrams illustrating heat maps of seasonal debris accumulation on a map of a mobile cleaning robot's environment.

In some examples, the mapping system 514 can generate a graphical representation of the seasonal debris state on the map. The graphical representation of the seasonal debris state can indicate a spatial density of the seasonal debris in the environment. An example of spatial density representation of the seasonal debris accumulation is a heat map. FIG. 8A illustrated a heat map 800A of pollen location on a map of a home. The mobile cleaning robot 510 can track the location of pollen accumulation in the environment over time (e.g., from days to weeks) during the pollen season. The tracked location data can be used to create the heat map 800A representing a spatial distribution of pollen counts in the user's home during a typical pollen season. In the example as shown in FIG. 8A, four high-density pollen zones can be identified from the heat map 800A, including three window areas 812, 814, and 816, and an entry door area 818. A user may add annotations of the high-density pollen zones on the map. The mobile cleaning robot can execute a cleaning mission including cleaning the high-density pollen zone in accordance with a seasonal cleaning schedule.

Figure 8B:
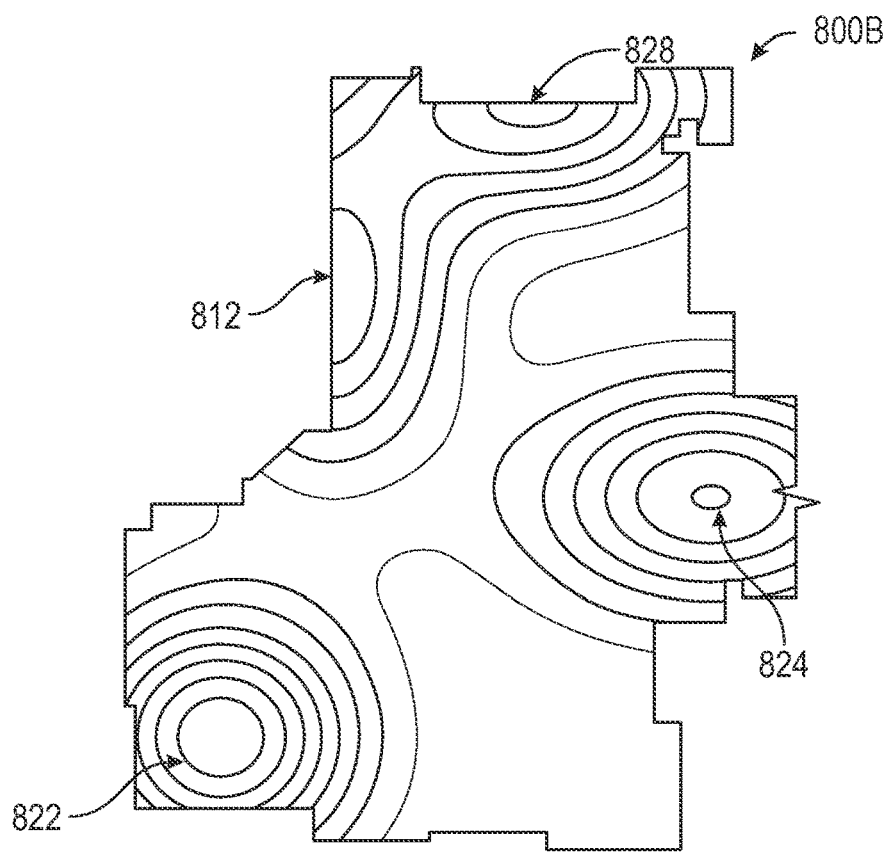

FIG. 8B illustrates a heat map 800B of pet location on a map of a home. The mobile cleaning robot 510 can track the location of a pet in the home over time during the shedding season. The tracked pet location data can be used to create the heat map 800B representing where the pet spends the most time during the observation period. A higher line density indicates locations where a pet spends relatively more time and lower line density indicates locations where a pet spends relatively less time. In the example as shown in FIG. 8B, four locations 822, 824, 826, and 828 where the pet spends more time can be identified from the heat map 800B. Locations where the pet spends relatively more time can be designated for additional cleaning during times of expected increased shedding. The heat map 800A can additionally or alternatively correspond to a density of pet utility locations (e.g., pet toys, bed, feeder, tools), or a density of pet hair detected and localized by the debris detector/localizer 513 of the mobile cleaning robot. For example, the high density lines correspond to a relative higher density of pet hair and lower density of lines correspond to a relative lower density of pet hair, a user may add annotations of the pet location or pet hair on the map. The identified high-density pet hair areas can be included in a cleaning schedule for additional cleaning during times of expected increased shedding.

The navigation controller 516 can generate a control signal to the drive system 517 to drive to the designated area of the robot environment, and a control signal to the cleaning system 518 to perform a cleaning mission in accordance with the seasonal cleaning schedule. The seasonal cleaning schedule may include cleaning tasks to be carried out within a specified time period, such as during an identified pollen season, pet-shedding season, or rainy season, as discussed above with reference to FIGS. 6A-6C and 7A-7C. The seasonal cleaning schedule may include a sequence of rooms or floor surface areas to be cleaned by the mobile cleaning robot. The mobile cleaning robot may have a vacuum assembly and uses suction to ingest debris as the mobile cleaning robot traverses the floor surface. In another example, the seasonal cleaning schedule may include a sequence of rooms or floor surface areas to be mopped by a mobile mopping robot. The mobile mopping robot may have a cleaning pad for wiping or scrubbing the floor surface. In some examples, the seasonal cleaning schedule may include tasks scheduled to be executed by two mobile robots sequentially, intertwined, in parallel, or in another specified order or pattern. For example, the navigation controller 516 may navigate a mobile cleaning robot to vacuum a room, and navigate a mobile mopping robot to mop the room that has been vacuumed.

Figure 9:
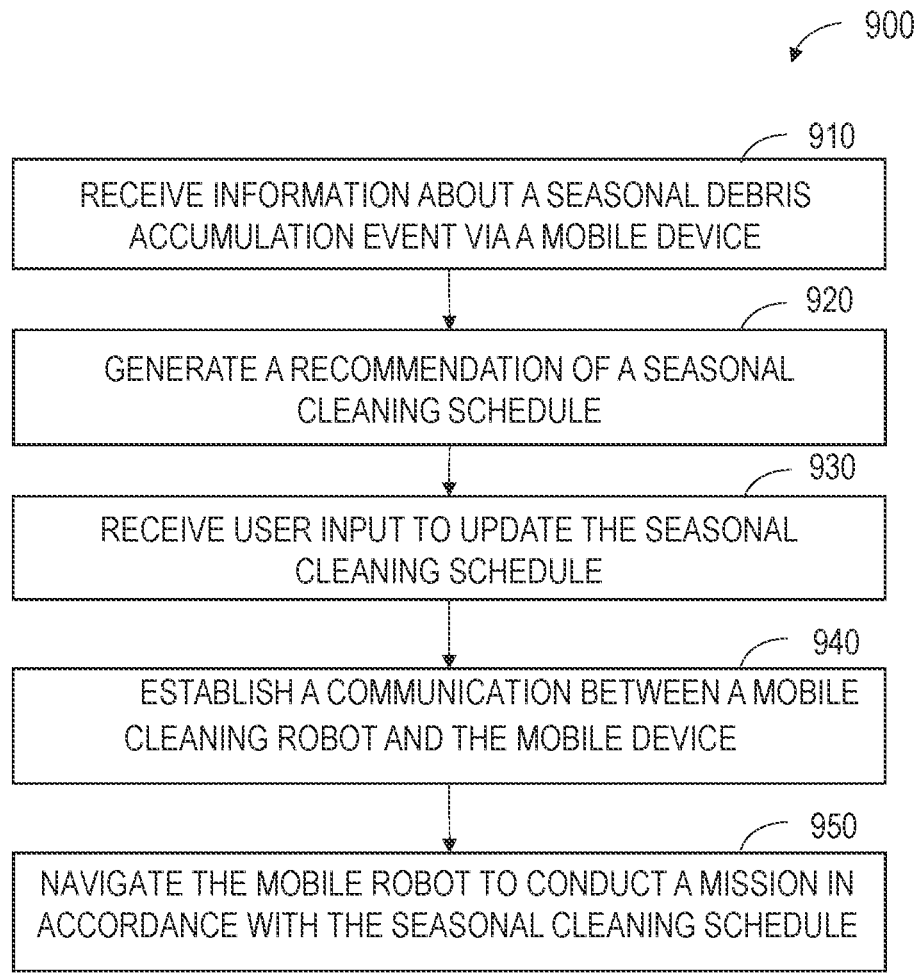
FIG. 9 is a flow diagram illustrating an example of a method for creating a seasonal cleaning schedule for a mobile cleaning robot and cleaning the environment using the same.

Example Method for Creating a Seasonal Cleaning Schedule and Controlling Cleaning FIG. 9 is a flow diagram illustrating an example of a method 900 for creating a seasonal cleaning schedule for an autonomous mobile robot (such as the mobile cleaning robot 100, or the mobile cleaning robot 510) and controlling the autonomous mobile robot to execute a mission in an environment in accordance with the seasonal cleaning schedule.

The seasonal cleaning schedule can be based on a seasonal or environmental debris accumulation event. The method 900 can be implemented in, and executed by, the mobile robot system 500 comprising an autonomous mobile robot a cleaning robot) and a mobile device, as described above with reference to FIG. 5. The method 900 may be used for scheduling and controlling one or more mobile robots of various types, such as a mobile cleaning robot, a mobile mopping robot, or a lawn mowing robot.

The method 900 commences at step 910 to receive information about a seasonal debris accumulation event via a mobile device. A seasonal debris accumulation event may include, for example, pollen production during a pollen season, increased pet shedding during a shedding season, or an environmental or weather event such as mud, rain, or snow being tracked into certain areas of a home in a rainy season or a snowy season. Information about a seasonal debris accumulation event may include, for example, timing or a timespan of such an event in a typical year. The received information may include geographical location of the mobile cleaning robot's environment (e.g., the user's home), which can be obtained from a geo-location service that uses GPS or other location technologies. In an example, the received information may include a forecast of an upcoming environmental event, such as rain, wind, snow, pollen index, mold count, among others, which can be received from a weather service. Information about the geographical location of the mobile robot's environment and/or the forecast of the upcoming environment event may be used to determine or predict timing or a timespan of the seasonal debris accumulation event, such as a pollen season. In an example, the received information may include pet information such as presence and number of pets in the household, and breed, type, age, approximate weight of each pet. The pet information may be used to determine or to predict an amount of pet hair in the environment during the shedding season. In yet another example, the received information may include environmental conditions specific to the user's home, such as quantities and varieties of plants in the area of the user's home, and/or the distances or orientations of the plants relative to the user's home. The specific environmental conditions may be used to determine or predict an amount of pollen or pollen distribution in different areas of the user's home during a pollen season.

At 920, a recommendation of a seasonal cleaning schedule may be generated, such as using the cleaning schedule generator 524. The seasonal cleaning schedule can be generated based on the predicted timing (e.g., a timespan) or a predicted debris state of a seasonal debris accumulation event. The seasonal cleaning schedule may include a one or more of a cleaning area, a cleaning time, or a cleaning mode. The cleaning area can be the entire environment (e.g., user's home), or a portion thereof which can be specified by the user. The predicted cleaning time may include specific days and time within the predicted timing or timespan. In an example, the cleaning time 526 can be defined as 9:00 a.m. on Monday, Wednesday, and Friday every week during the predicted timespan of the seasonal debris accumulation event determined by the seasonal event predictor 521. The cleaning mode represents how the mobile cleaning robot clean a cleaning area, and may include deep clean, spot clean, quick clean, vacuum followed by mopping, among others. The cleaning mode can differ in the number of passes over the same area, time spent to clean an area, cleaning power, etc.

For a particular cleaning area, the seasonal cleaning schedule can vary in cleaning time, cleaning mode, or both based on the predicted debris state of that area. For example, the seasonal cleaning schedule may include a first cleaning time for cleaning the area when it is projected to have a relatively high debris state (e.g., during a peak pollen season or pet-shedding season), and a different second cleaning time for cleaning the same area when it is projected to have a relatively low debris state (e.g., during times off the pollen season or pet-shedding season. In another example, the seasonal cleaning schedule may include a first cleaning mode (e.g., a "deep clean" mode characterized by repeated or multi-pass cleaning over the same area, a longer cleaning time, or a higher power) when the area is projected to have a relatively high debris state, and a different second cleaning mode (e.g., a "standard clean" mode or a "quick clean" mode characterized by a single or less pass over a same area, a shorter cleaning time, or a lower cleaning power) when the area is projected to have a relatively low debris state.

At 930, a user may accept, decline, or modify the recommended seasonal cleaning schedule or a portion thereof. The recommended seasonal cleaning schedule can be a separate schedule than an existing "default" or regular cleaning schedule not taking into account the seasonal or environmental debris accumulation events. Alternatively, the recommended seasonal cleaning schedule can be a modification of the existing cleaning schedule, such as by adding extra cleaning tasks to the existing cleaning schedule. In the examples as illustrated in FIGS. 6A-6C and 7A-7C, the existing cleaning schedule and the recommended seasonal cleaning schedule can be presented to the user. The existing cleaning schedule defines times for cleaning designated areas in the user's home. The user can modify the existing cleaning schedule by adding one or more recommended extra cleaning times to the existing schedule. The extra cleaning time can be a one-time cleaning, or a recurrently scheduled cleaning. Additionally or alternatively, the user can modify the existing cleaning schedule by modifying the cleaning mode in the exiting cleaning schedule. In an example, a modified cleaning mode may include mopping more frequently to ensure collection of the fine pollen particles. For example, a recommendation can be provided to mop the floor after each vacuuming mission during the time period with relatively high pollen levels. In an example, mopping can be recommended before vacuuming, or without vacuuming to prevent or reduce pollen being dispersed into the air via vacuuming. In an example where a user co-cleans with the robot (e.g., the user dusts or does other cleaning chores while the robot vacuums or mops), a recommendation can be provided to the user to not dust when pollen or other airborne particulate matter is relatively high.

At 940, a communication between the mobile device and the mobile cleaning robot can be established. The communication may be a direct communication link without an intermediate device of system. Alternatively, the communication can be via an intermediate system such as the cloud computing system 406. In an example, the mobile device may include a user interface that can display robot information and its operating status. A user may manage a suite of active mobile robots and coordinate their activities.

At 950, the seasonal cleaning schedule can be transmitted to the mobile cleaning robot such as via a communication link, and the mobile robot may be navigated about the environment to conduct a mission in accordance with the seasonal cleaning schedule. In some examples, the mobile cleaning robot can use its onboard sensors, or external IoT sensors mounted in actuatable environmental control nodes, to detect and localize debris accumulation (e.g., pollen or other particulates, pet hair, mud, or other debris), or objects of interest (e.g., entry doors, windows, pets or pet utilities), as the mobile cleaning robot traverses the environment. For example, areas adjacent to windows and entry doors are prone to pollen buildup. Areas where pets frequent or where pet utilities are detected are prone to excess pet hair during a shedding season, as the mobile cleaning robot traverses the environment. In some examples, the detection of the debris or objects of interest can be graphically represented on a map of the environment. In an example, the graphical representation may include a heat map representing a spatial density of the debris or the objects in the environment, as illustrated in FIGS. 8A-8B.

Based on the detection of the debris or other objects of interest or the graphical representation of the detection, the mobile cleaning robot can dynamically adjust one or more of the cleaning area, the cleaning time, or the cleaning mode in a seasonal cleaning schedule. In some examples, the size of the cleaning area (e.g., anticipated pollen area) can be adjusted based on environmental or weather conditions, such as wind speed and direction, or quantities and varieties of plants around the user's home. The mobile cleaning robot may be navigated about the environment to conduct a mission in accordance with the dynamically adjusted seasonal cleaning schedule.

Examples of Machine-Readable Medium for Mobile Robot Scheduling

Figure 10:
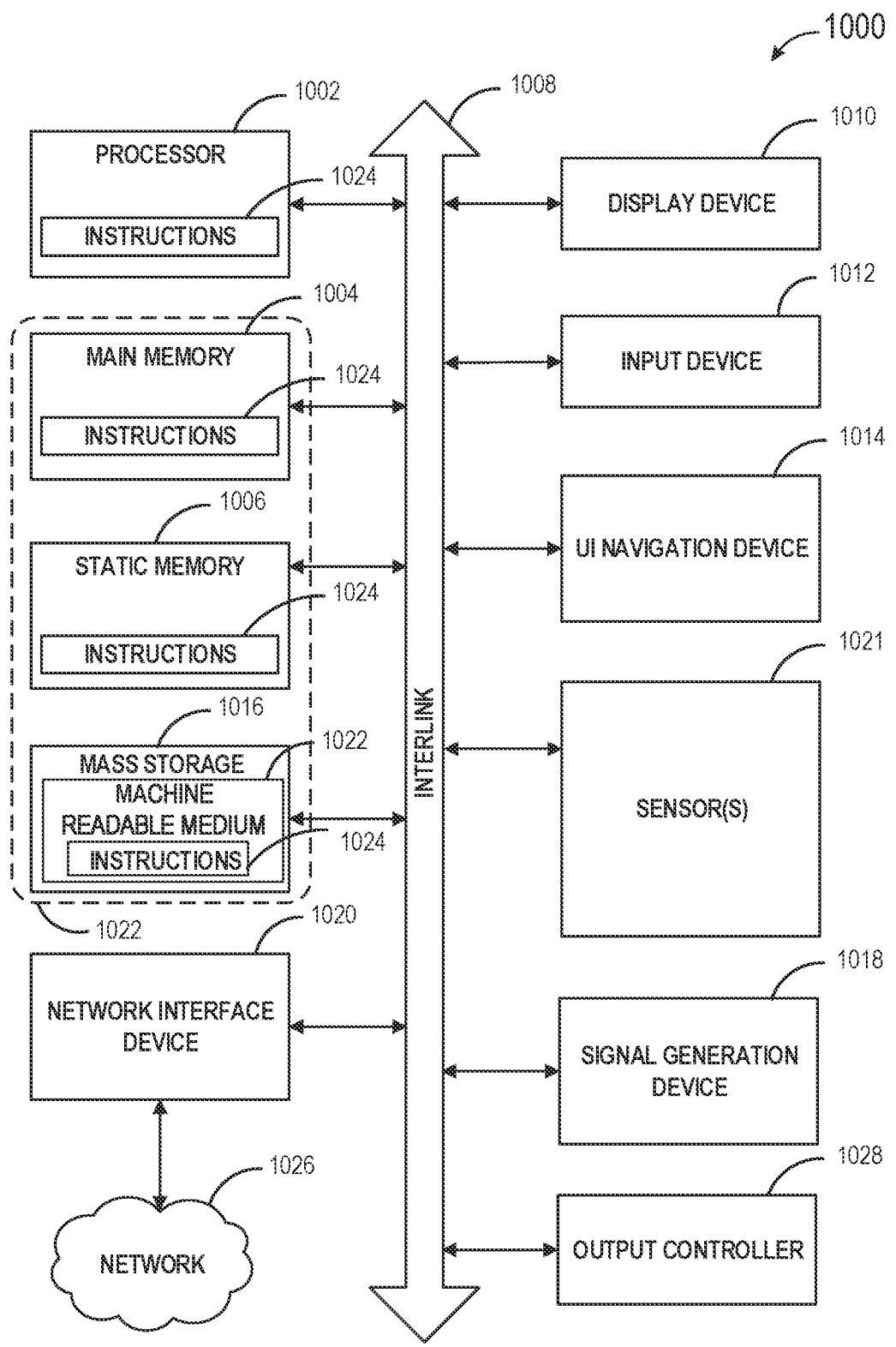
FIG. 10 is a block diagram illustrating an example machine upon which any one or more of the techniques (e.g., methodologies) discussed herein may perform.

FIG. 10 illustrates generally a block diagram of an example machine 1000 upon which any one or more of the techniques (e.g., methodologies) discussed herein may perform. Portions of this description may apply to the computing framework of various portions of the mobile cleaning robot 100, the mobile device 404, or other computing system such as a local computer system or the cloud computing system 406.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or m combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010 (e.g., a raster display, vector display, holographic display, etc.), an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensors. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine-readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 1024 may further be transmitted or received over a communication network 1026 using a transmission medium via the network interface device 1020 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communication network 1026. In an example, the network interface device 1020 may include a plurality of antennas to wirelessly communicate using at least one of single-input multiple-output (SIMO), multiple-input multiple-output (AMMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A mobile cleaning robot, comprising:
   a motor-driven drive system configured to move the mobile cleaning robot about an environment;
   a cleaning system; and
   a controller configured to:
   receive a seasonal cleaning schedule corresponding to a seasonal debris accumulation event, the seasonal cleaning schedule including instructions to clean a portion of the environment based on a seasonably varied debris state;
   provide a control signal to the motor-driven drive system and the cleaning system to execute a cleaning mission in the environment in accordance with the seasonal cleaning schedule; and
   generate a map of the environment and a graphical representation of a spatial density of seasonal debris in the environment on the map.

2. The mobile cleaning robot of claim 1, wherein the seasonal debris accumulation event includes seasonal pollen production during a geographically variable pollen season,
   wherein the controller is configured to predict the geographically variable pollen season for a geographical location of the environment.

3. The mobile cleaning robot of claim 2, wherein the seasonal cleaning schedule includes a seasonal cleaning mode for cleaning a pollen area in the environment.

4. The mobile cleaning robot of claim 3, wherein the controller is coupled to a sensor of the mobile cleaning robot to detect and localize the pollen area in the environment.

5. The mobile cleaning robot of claim 1, wherein the seasonal debris accumulation event includes seasonal pet shedding during a pet-shedding season,
   wherein the controller is configured to predict the pet-shedding season based on a geographical location of the environment, or based on pet information including presence, age, breed, or weight of a pet in the environment.

6. The mobile cleaning robot of claim 5, wherein the seasonal cleaning schedule including a seasonal cleaning mode for cleaning a pet shedding area in the environment.

7. The mobile cleaning robot of claim 6, wherein the controller is coupled to a sensor of the mobile cleaning robot to detect a pet in the environment, and to determine the pet shedding area based on the detected pet.

8. The mobile cleaning robot of claim 6, wherein the controller is coupled to a sensor of the mobile cleaning robot to detect a pet utility in the environment, and to determine the pet shedding area based on the detected pet utility.

9. The mobile cleaning robot of claim 1, wherein the controller is configured to receive information about a timespan for the seasonal debris accumulation event based on a geographical location of the environment, and
   wherein the seasonal cleaning schedule is based on the timespan of the seasonal debris accumulation event.

10. The mobile cleaning robot of claim 9, wherein the controller is configured to receive the information about the timespan of the seasonal debris accumulation event from an internet-connected device, or from a user input to a mobile device, communicatively coupled to the mobile cleaning robot.

11. The mobile cleaning robot of claim 1, wherein the seasonal cleaning schedule includes cleaning the portion of the environment having a first debris state at a first cleaning time, and cleaning the portion of the environment having a second debris state at a second cleaning time, the first debris state having a higher expected debris accumulation in the environment than the second debris state.

12. The mobile cleaning robot of claim 11, wherein the seasonal cleaning schedule includes a first cleaning mode for cleaning the portion of the environment having the first debris state, and a second cleaning mode, different from the first cleaning mode, for cleaning the portion of the environment having the second debris state.

13. A mobile robot system, comprising:
a mobile cleaning robot comprising:
 a motor-driven drive system configured to move the mobile cleaning robot about an environment;
 a cleaning system;
 a controller; and
 a mobile device operably in communication with the mobile cleaning robot and configured to receive information about a seasonal debris accumulation event, and to generate a seasonal cleaning schedule corresponding to the seasonal debris accumulation event, the seasonal cleaning schedule including instructions to clean a portion of the environment based on a seasonably varied debris state,
wherein the controller of the mobile cleaning robot is configured to:
 receive the seasonal cleaning schedule from the mobile device;
 provide a control signal to the mobile cleaning robot to execute a cleaning mission in the environment in accordance with the seasonal cleaning schedule; and
 generate a map of the environment and a graphical representation of a spatial density of seasonal debris in the environment on the map.

14. The mobile robot system of claim 13, wherein the seasonal debris accumulation event includes seasonal pollen production during a pollen season, and the mobile device is configured to:
 receive information about a geographical location of the environment;
 determine the pollen season based on the geographical location of the environment; and
 determine the seasonal cleaning schedule based on the pollen season.

15. The mobile robot system of claim 14, wherein:
the controller is coupled to a sensor of the mobile cleaning robot to detect and localize a pollen area in the environment; and
the seasonal cleaning schedule includes a cleaning mode for cleaning the pollen area.

16. The mobile robot system of claim 15, wherein the controller is configured to receive information about an environmental or weather condition, and to adjust the pollen area based on the environmental or weather condition.

17. The mobile robot system of claim 13, wherein the seasonal debris accumulation event includes seasonal pet shedding during a pet-shedding season, and wherein the mobile device is configured to:
 receive information about a geographical location of the environment, or pet information including age, breed, or weight;
 determine the pet-shedding season based on the geographical location of the environment or the pet information; and
 determine the seasonal cleaning schedule based on the pet-shedding season.

18. The mobile robot system of claim 17, wherein:
the controller is coupled to a sensor of the mobile cleaning robot to detect and localize a pet shedding area in the environment; and
the seasonal cleaning schedule includes a cleaning mode for cleaning the pet shedding area.

19. The mobile robot system of claim 18, wherein the controller is coupled to the sensor of the mobile cleaning robot to detect a pet in the environment, and to determine the pet shedding area based on the detected pet.

20. The mobile robot system of claim 18, wherein the controller is coupled to the sensor of the mobile cleaning robot to detect a pet utility in the environment, and to determine the pet shedding area based on the detected pet utility.

* * * * *